United States Patent [19]

Farrell et al.

[11] Patent Number: 5,377,191
[45] Date of Patent: Dec. 27, 1994

[54] NETWORK COMMUNICATION SYSTEM

[75] Inventors: John M. Farrell; Philip J. S. Gladstone, both of Cambridge, United Kingdom

[73] Assignee: Data General Corporation, Westboro, Mass.

[21] Appl. No.: 604,696

[22] Filed: Oct. 26, 1990

[51] Int. Cl.⁵ .............................................. H04J 3/24
[52] U.S. Cl. ................................................ 370/94.1
[58] Field of Search ................. 370/94.1, 60, 62, 85.6,
370/85.1, 85.13, 85.14, 85.15, 95.3, 94.3;
379/202, 93, 94, 96, 112, 114, 168, 219, 220,
225, 271, 272, 34, 62; 455/9, 115; 340/825.5,
825.02, 825.51; 380/18; 371/3; 395/650;
364/483, 492

[56] References Cited

U.S. PATENT DOCUMENTS

| | | | |
|---|---|---|---|
| 3,676,846 | 7/1972 | Busch | 364/200 |
| 4,475,189 | 10/1984 | Herr et al. | 370/62 |
| 4,475,190 | 10/1984 | Marouf et al. | 370/62 |
| 4,562,550 | 12/1985 | Beatty et al. | 364/483 |
| 4,620,283 | 10/1986 | Butt et al. | 364/493 |
| 4,658,351 | 4/1987 | Teng | 395/650 |
| 4,685,125 | 8/1987 | Zave | 379/96 |
| 4,734,931 | 3/1988 | Bourg et al. | 379/93 |

OTHER PUBLICATIONS

"Operating Systems: Design and Implementation"; Andrew S. Tannenbaum; pp. 104–105.
Proceedings Real–Time Systems Symposium, Dec. 3–5, 1985; pp. 67–75.
"Real Time Dist. Control with Async. Message Reception" Operating Systems Review; pp. 32–44; An Input-/Output Subsystem for the Hawk Operating System Kernel; Aug. 10, 1987.

Primary Examiner—Douglas W. Olms
Assistant Examiner—Dang Ton

[57] ABSTRACT

In a network communication system passing messages between gateways via a message handling system the gateways are interfaced specifically to their respective network access units and are interfaced generically to the message handling system using routines common to all gateways. Messages are sent in protocol data units including recipient addresses which do not identify recipient gateways as such; the gateways are used transparently. The data format is CCITT 1988 X400 standard with automatic conversion to and from this format at sending and receiving gateways plus automatic document conversion. Message handling involves waiting for many services and events. The invention allows calling routines to avoid pending while waiting for events and services. Service routines, including event watching and timer routines, schedule notifications on to queues and the main processing task runs notifications off the queues by calling a run routine.

26 Claims, 17 Drawing Sheets

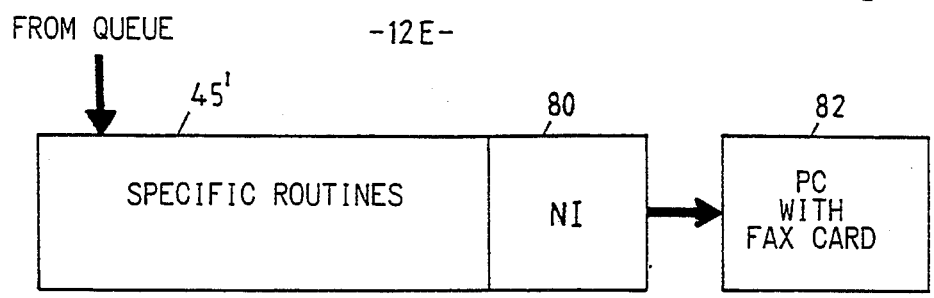
FIG. 12
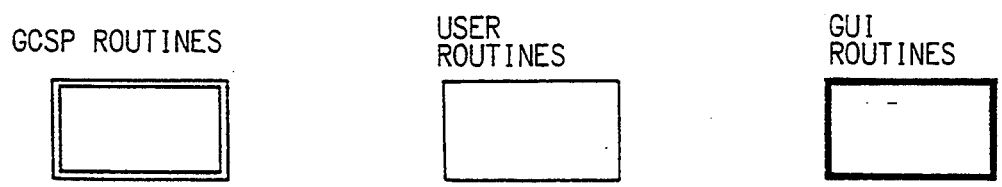
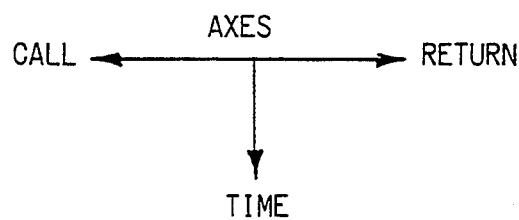
FIG. 14

| 0 | 1 | 2 | 3 | 4 | 31 |
|---|---|---|---|---|---|
| RUNNING | WAITING | WAKE_UP | JOB_SCHEDULED | RESERVED | |

FIG. 22

| | |
|---|---|
| NEXT | OWNER'S NEXT JOB Q |
| PREV | OWNER'S PREV JOB Q |
| PRIORITY | PRIORITY LEVEL OF Q |
| QUID | QUID OF THIS JOB Q |
| USER_WAKEUP | WAKEUP ROUTINE FOR Q |
| HEAD | FIRST NCB ON JOB Q |
| TAIL | LAST NCB ON JOB Q |

FIG. 23

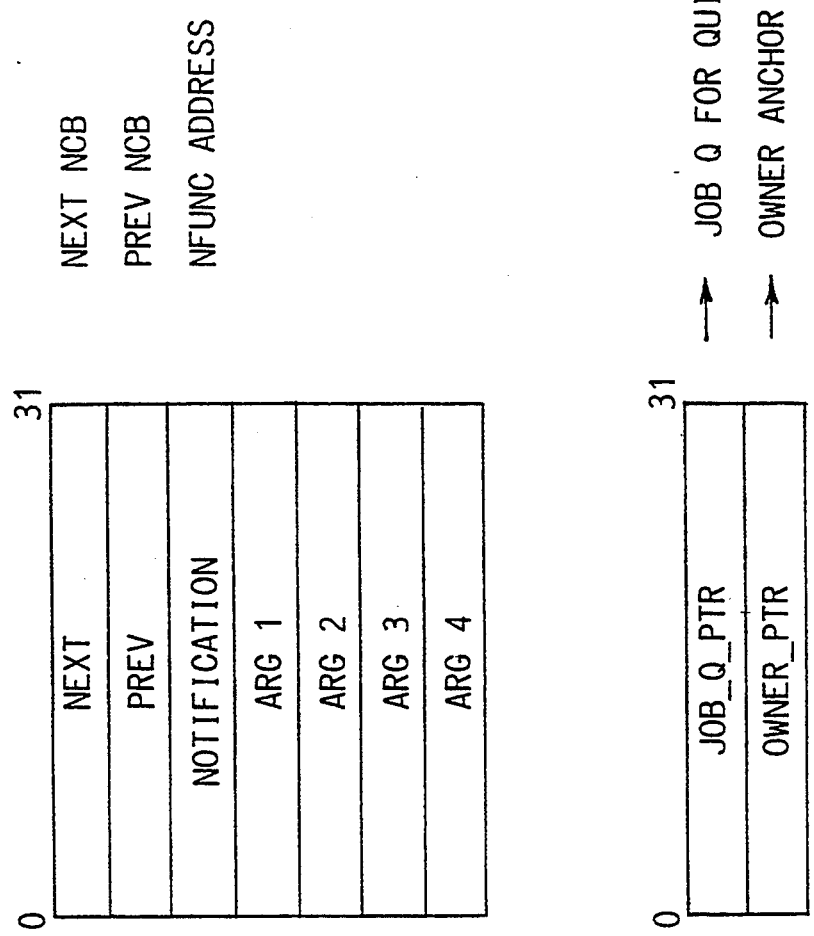

NETWORK COMMUNICATION SYSTEM

BACKGROUND OF THE INVENTION

1. Field of the Invention

This invention relates to a network communication system for use in handling communications between access units which may comprise office automation systems, telex, teletex, facsimile, etc.

Abbreviations and acronyms used herein are listed at the end of the description. References to Data General are to Data General Corporation, the assignees of the present application.

2. Description of the Prior Art

There exist today many proprietary communications systems and various international standards relating to message handling and data transmission. Nevertheless there is no system in existence which will allow all kinds of access units to communicate freely with one another.

It is true that there do exist gateway systems, known commercially as Soft-Switch and Mailbus which are intended to allow interchange of messages between dissimilar systems. However these known systems are essentially suitable for use by private corporate and other large users because they utilize a proprietary message transfer protocol handled via a central processing system which converts from and to the message protocols employed by the various gateways. Moreover they are set up as complete systems in which each gateway has to know what other gateways there are on the system and what are the characteristics of the various gateways.

The known systems are neither intended for nor suitable for public services.

Another problem with which the invention is concerned arises in conjunction with computer operating systems (e.g. MS-DOS and UNIX) which are single threaded, i.e. they can handle only a single processing thread at a time. This leads to the result that routines frequently have to wait if the processing path comes to a halt while waiting for an external event. The routine is said to pend. Although other operating systems can handle multiple threads (e.g. AOS/VS) the system according to the invention is desirably not restricted to a particular operating system and should be capable of operating with single threaded operating systems. Some systems, e.g. UNIX can simulate multitasking by holding a plurality of copies of a program in memory and scheduling the allocation of the CPU to the different processes. However this is wasteful of memory resources. MS-DOS has no built-in facilities for achieving even this level of multi-tasking.

In a network communication system waiting for events occurs all the time, e.g. as transfers are effected across interfaces, and single threaded systems lead to inefficient usage of computer resources, for the reasons explained above.

SUMMARY OF THE INVENTION

The object of the present invention is to provide an improved system which will allow access units to utilize gateways or nodes in an unrestrained way, without any knowledge of the nature of the system or of the other gateways or nodes in the system.

The terms "node" and "gateway" are used interchangeably herein even although some nodes may not by strictest definition be gateways.

More specifically the improved system is intended to be utilizable by PTTs (postal, telegraph and telephone authorities) to provide gateways which may be accessed by the respective access units for transparent communication with access units connected to the same system or another system installed by a different PTT.

The improved system is equally suitable for use by other large users such as public and private corporations for example.

Another object of the invention is to avoid the need for routines to pend awaiting external results, even in a single threaded operating system. Such a routine will be called an unpended routine.

The network communication system according to the invention comprises a plurality of gateways or nodes for serving respective access units. For example, one node may serve a facsimile network, another node a telex network, other gateways a plurality of proprietary office automation systems such as CEO (Data General Corporation), DISOSS and PROFS (both IBM), etc.

The gateways or nodes are connected to communicate with each other via a standard message handling system, preferably the CCITT X400 Standard, hereby incorporated by reference. X400 exists in a 1984 version (denoted 1984 X400 herein) which has been implemented by many users. X400 also exists in a 1988 version (denoted 1988 X400 herein) and it is this system which is preferably employed as the "backbone" of the inventive network communication system. It is particularly advantageous that the invention can thus employ an accepted, international standard and not introduce yet another proprietary message handling system. However, since 1988 X400 is not yet widely implemented, it is particularly advantageous to provide as one of the gateways an X400 gateway, which can interface the "backbone" to the somewhat lower-specified 1984 X400.

Each gateway or node of the system according to the invention comprises a network interface providing access to the access unit or units served by that gateway. This is the external, user-specific interface of the gateway. Each gateway moreover comprises an external message transfer interface (MTI) for sending messages to and receiving messages from the standard message handling system, or backbone.

Internally each gateway comprises a software interface which is identical in all gateways and moreover matches the message transfer interface. A library of core routines provide communication between the message transfer interface and the software interface. This library contains the bulk of the gateway software and, since it is the same for all gateways, the invention avoids the heavy expense of developing a lot of software specific to each gateway.

Each gateway further comprises a library of specific routines individual to that gateway and which provide communication between the network interface and the software interface. These routines convert between the format and protocols of the network interface (which are specific to each gateway) on the one hand and the standardised format and protocols of the software interface on the other hand. These node-specific routines represent a much smaller part of the software of each gateway.

Examples of the functions performed by the core routines are as follows:

Assemble and transmit a packet of data to the backbone

Receive and disassemble a packet from the backbone
Look up destination address in a directory
Submit a document to a document format converter
All housekeeping function, such as logging and audit trail, accounting, error handling.

Examples of the functions performed by the specific routines are as follows:
Convert from/to the format specific to the network served by the gateway.
Convert between addresses within the network served by the gateway and within the host backbone.

The communications between the gateways or nodes on the standard message handling system are effected in protocol data units (PDU's). Each PDU comprises—see X—400—an envelope part and a message part. The envelope part includes data identifying the message originator and the message recipient but does not contain any data specific to the gateway serving the message recipient. In accordance with X400 1988, the envelope part, denoted P1, comprises primarily the originator, the destination, message priority and an indication of whether a delivery report is required. The message part, denoted P2, comprises a header, which repeats much of the P1 data and includes a subject title, a document type identifier and the main body of the message.

This is a highly significant feature of the invention because it enables any access unit to send a message to any other access unit without concerning itself in any way with the nature of the receiving gateway. Indeed the originator does not have to know that any gateways are involved. The system according to the invention is completely transparent to its users and can be installed by PTTs to enhance greatly their message handling capabilities in a way which requires no action on the part of end users. What is more the system does not have to be reconfigured when a gateway is added or removed. Of course, users have to know the addresses with which they wish to communicate but the fact that they are on various gateways does not have to be known. This is because the envelope part of each PDU does not contain any data specific to the gateway serving the message recipient. All messages simply go out onto the universal messaging backbone and a gateway which recognises a recipient address accepts the message.

A subsidiary problem resides in the existence of different document formats. There are various word-processing formats in common use, various file formats and formats specific to telex and teletex. Further features of the invention relieve an originating access unit of any need to worry about the format details of the message recipient (although common sense must naturally be employed—it is no use expecting a highly formatted word-processing file to be handled satisfactorily by a telex recipient). Document converters for format conversion are known in themselves and may be incorporated in the network communication system according to the invention.

The envelope part of any protocol data unit whose message part consist of a document (or part of a document) includes format information identifying the document format. The library of specific routines of each gateway includes routines which are responsive to received format information to submit the message part automatically to the document converter when the format information identifies an incompatible format. Gateways are thus free to transmit in any document format, without regard to the document formats acceptable to recipients, secure in the knowledge that, if conversion is necessary, it will be taken care of automatically.

Within the message handling system, such as 1988 X400, there will be a standard address structure comprising many parts for identifying message originators and recipients. Most network interfaces will employ different address formats of much more restricted range. It is accordingly preferred to provide at least one directory accessible to each gateway via the message handling system. The library routines include routines which submit data identifying the message originator and message recipient at an originating gateway to the directory or directories. This is used to determine identifying data in a standard form (in accordance with the message handling system) for inclusion in the envelope part of the PDU. Further routines submit the identifying data in the envelope part of a received PDU to the directory or directories in order to determine at least the message recipient in the form which is required by the network interface of the receiving gateway.

Preferably the system comprises a main directory unit holding a directory which is directly accessible by all the gateways on the message handling system. This directory may be in compliance with the CCITT X500 Standard. However one or more subsidiary directories may be held in directory units within individual gateways. Such a directory is indirectly accessible to other gateways via the message handling system and the holding gateway.

The invention further comprises, as part of the core routines, an interface which can operate with different operating systems (such as AOS/VS on an MV computer, MS-DOS on a PC and UNIX on an MV computer or other hardware). The interface is referred to as a General Unpended Interface, GUI. Under GUI, when a routine wishes to make a request of a service provider, specifically a GUI-conformant service provider (GCSP) the user calls the relevant routine but does not wish to wait for its completion. Rather, the user is informed when the routine is complete by way of a notification routine. In the meantime the user can carry on with other processing.

BRIEF DESCRIPTION OF THE DRAWINGS

FIGS. 6 to 12 show the steps in handling a message in more detail, FIG. 14 shows a key to FIGS. 15, 16 and 17, FIGS. 15 to 17 show the flow of routines under GUI, FIGS. 20 to 25 show various GUI data structures.

DESCRIPTION OF THE PREFERRED EMBODIMENT

This description is in four main sections:
I General system description
II Network communication
III General unpended interface
IV Abbreviations and acronyms It is emphasised that the whole of the description is given by way example and the invention is not limited by any of the features disclosed, except insofar as defined by the appended claims. For example, GUI is described primarily in conjunction with a communications server system but it is not limited to this particular application. The GUI routines do not necessarily have the structure described. The organisation of the routines of the communications server system offers infinite possibilities for variation, and so on. Moreover the detailed coding of the routines and indeed the language in which they are coded are a matter of choice for the programmer implementing the invention within the context of particular hardware and for a particular application.

I GENERAL SYSTEM DESCRIPTION

Figure 1:
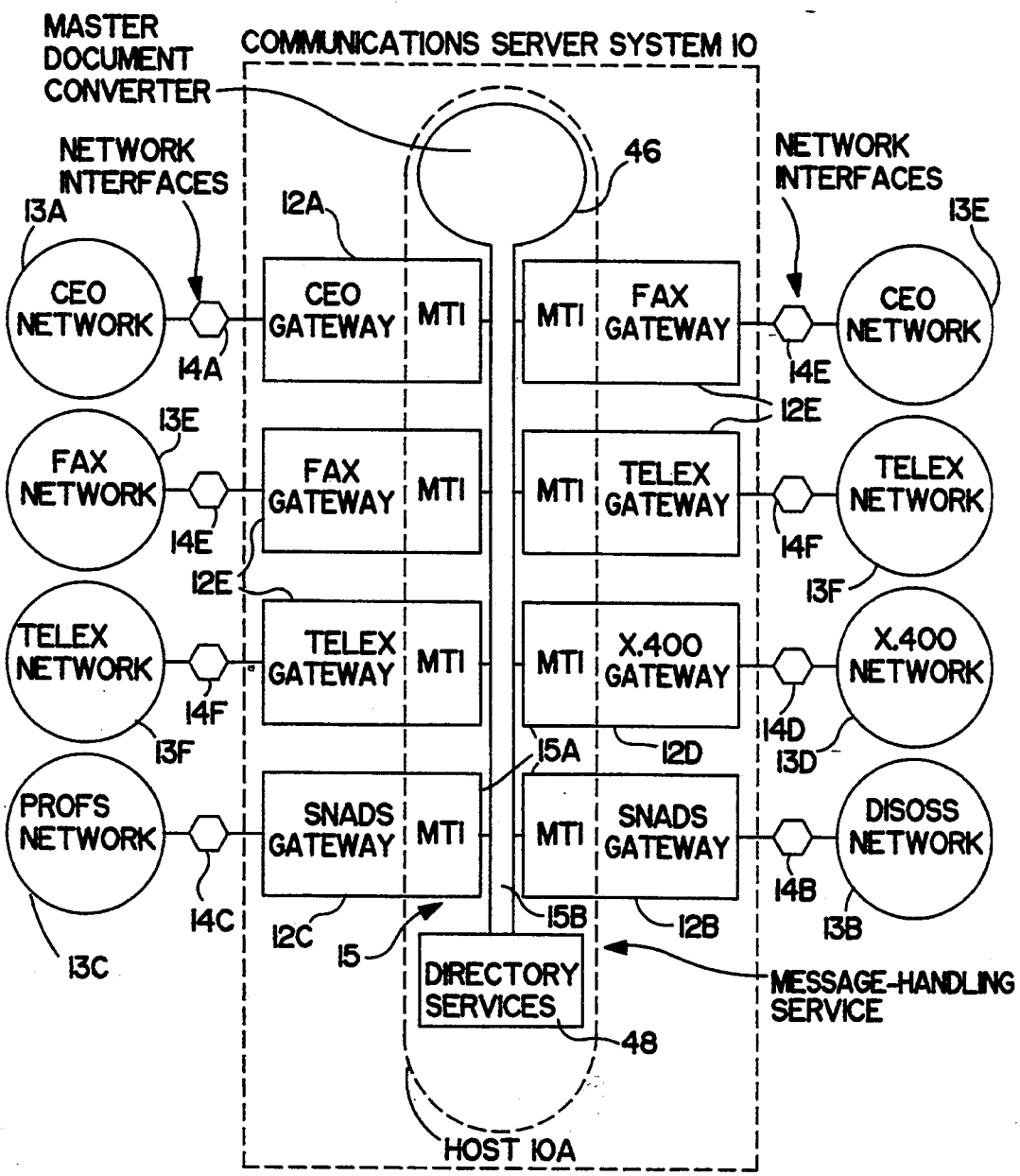
FIG. 1 illustrates the overall system.
Figure 2:
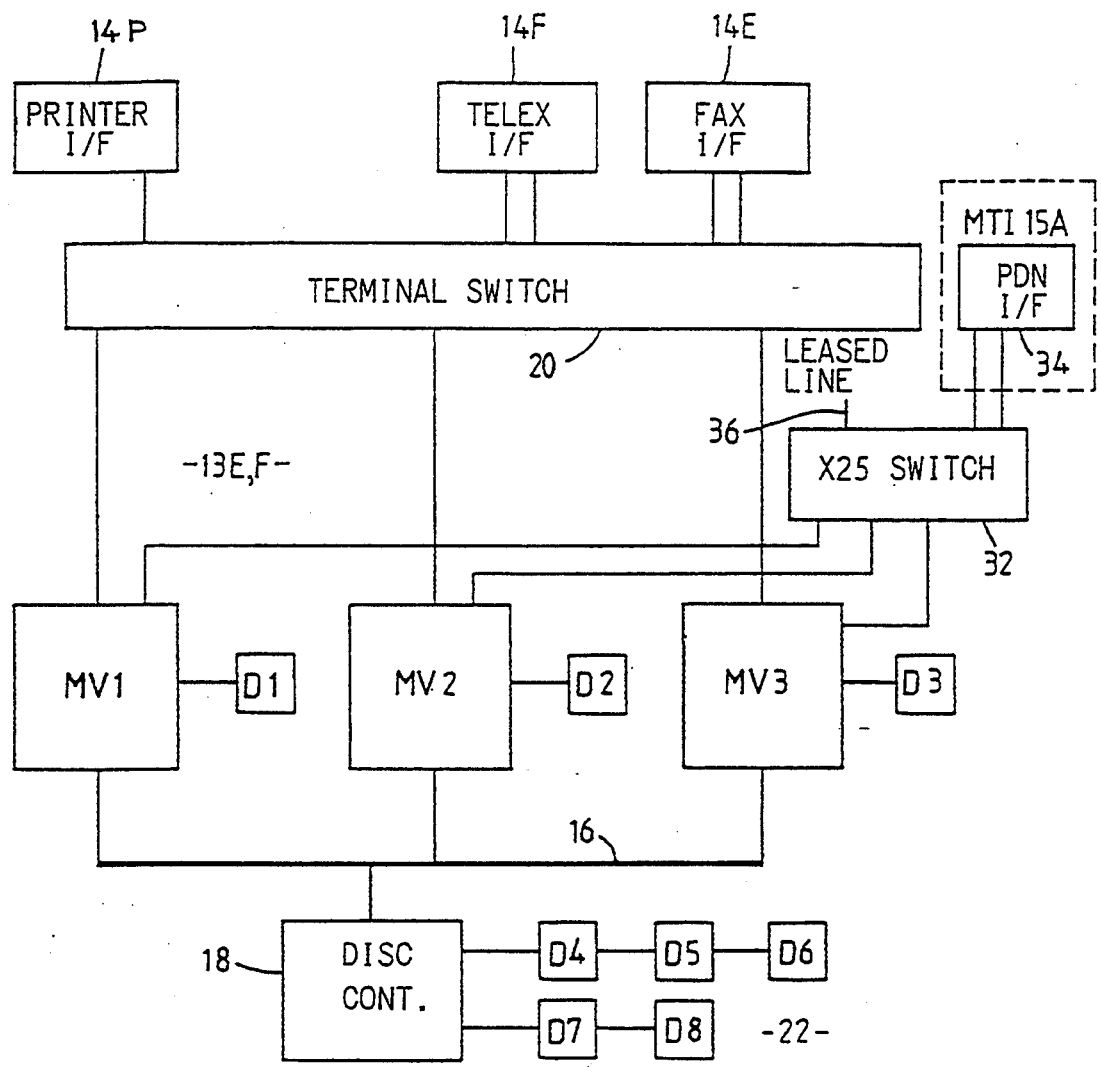
FIG. 2 is a block diagram of the hardware of one gateway of the system.

FIG. 1 shows a plurality of nodes or gateways 12 communicating with each other via a universal messaging backbone 15 using the 1988 X400 protocol and, at least in part, the X25 packet switched message transfer protocol (although each gateway may use other media for part of its communication path, e.g. land lines). FIG. 1 shows eight gateways by way of example; there is in principle no restriction on the number of gateways. Examples of the gateways are:

CEO gateway 12A for the Data General CEO office automation network 13A
SNADS gateway 12B for IBM DISOSS office automation network 13B
SNADS gateway 12C for IBM PROFS office automation network 13C
X400 gateway 12D for 1984 X400 communication with X400 network 13D
Fax/telex gateways 12E for communication with fax and telex networks 13E, F Each gateway is connected to its network through a standard interface or access unit 14A–14F. For clarity, each gateway is shown dedicated to a single network and indeed such a configuration may well be adopted in practice, at least so far as some gateways are concerned. On the other hand, a single gateway may serve a plurality of different access units. FIG. 2 described below is a combined fax/telex (telefax) gateway and, as another example, a gateway may be both a CEO gateway and a fax/telex gateway. This requires the gateway to have both the necessary interfaces and also the necessary specific routines for each type of access unit.

The overall system in FIG. 1 is denoted Communications Server (CS) System 10. Each gateway 12 has an interface 15A denoted MTI for message transfer interface and these interfaces communicate via the 1988 X400 protocol as indicated by a 'bus' 15B—which may be constituted physically by any form of communications links. The interfaces 15A and 'bus' 15B constitute the messaging backbone 15. The 'bus' 15B also provides communication with directory services 48 and a master document converter 46. These services, coupled with the messaging backbone 15 itself may be regarded as the host 10A of the communications server system 10.

The physical location of the master document converter 46 and the directory services 48 is immaterial. Structurally, each may comprise a database and a processing facility and each may thus be physically located in one of the gateways 12 or in a dedicated gateway. The master document converter 46 implements conversion routines, such as are well-known per se in PC programs, as well as in more sophisticated applications software. The directory services 48 database may be, as already stated, in compliance with the CCITT X500 Standard, hereby incorporated by reference and provides standard database facilities for querying and searching directory entries as well as adding, amending and deleting entries.

FIG. 2 shows the overall hardware configuration of a typical gateway, which interfaces to a plurality of networks and devices. A combined telex/fax (telematic) gateway 13E,F is chosen as the illustrated example. It is assumed that a plurality of computers are required to handle the volume of processing and the embodiment shown comprises three Data General MV series minicomputers MV1, MV2, MV3, each with an associated disk drive D1, D2, D3 storing the respective computer programs. The computers are connected by a high speed LAN 16, such as a standard (thick) Ethernet LAN or an MRC bus carrying 400 Mb/s. The computers are further connected via a disk controller 18 to a bank of disk drives D4 to D8 (for example) constituting a disk farm 22 for molding the user data.

The computers are connected via a terminal switch 20 to a plurality of interfaces here shown as a telex interface 14F, a fax interface 14E and a printer interface 14P. The terminal switch 20 enables the various access units to share the computer resources and moreover enables two good computers to be used when one is down and generally makes it possible to use the resources in a flexible manner. In principle the invention does not require a plurality of computers and the way in which a plurality of computers is used forms no part of the invention. Briefly they will be handled in accordance with the known principles of multi-processor systems with one computer acting as master and assigning the activities of the others and controlling the terminal switch 20 and an X25 switch 32 so that the correct computer communicates with the correct interface for each input/output operation performed, also with provision for a different computer to take over as master under fault conditions. In a simpler system, there will be one computer and the terminal switch 20 will not be required.

Each computer moreover has a connection to the X25 switch 32 connected to a PDN (public data network) interface 34 and possibly also to a leased line 36, one use for which would be a direct connection to another gateway. The interface 34 implements the message transfer interface 15A of FIG. 1, forming part of the universal messaging backbone 15.

Figure 3:
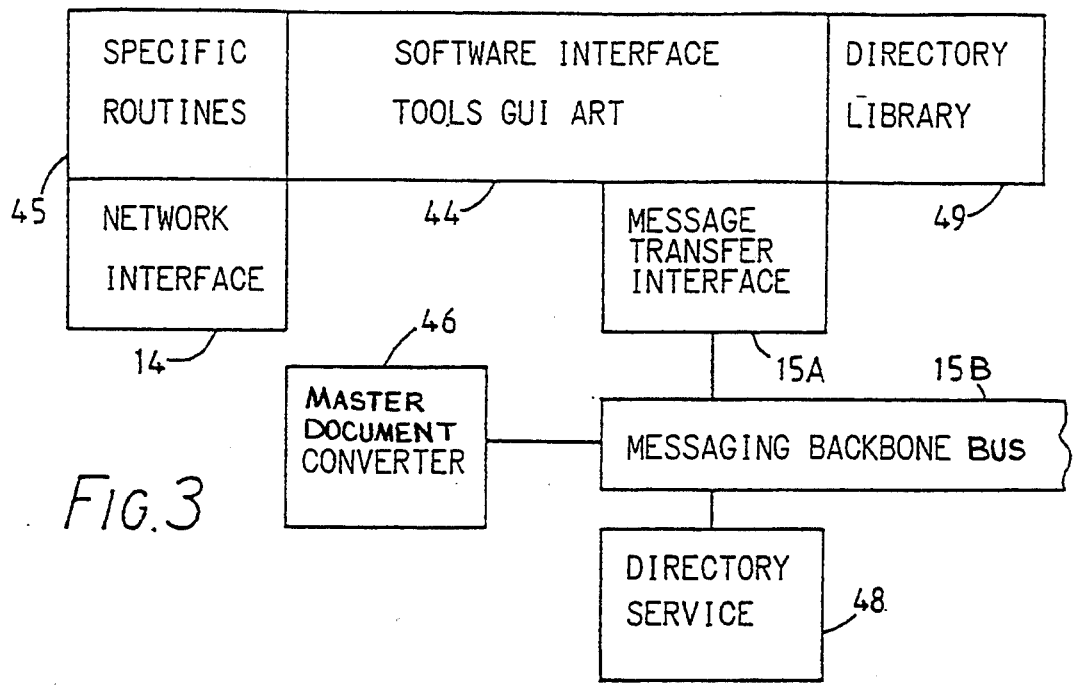
FIG. 3 is a functional block diagram of one gateway of the system.

FIG. 3 is drawn as another block diagram but illustrates the configuration of a gateway in functional terms rather than hardware terms. If the gateway is again assumed by way of example to be a telematic gateway serving telex and fax, the actual telex and fax communications will be handled by standard items with which the present invention is not concerned, e.g. a Hasler telex unit and a PC with a fax card, such as a GammaFax CP/T card. These standard items communicate with a network interface 14 which acts as one port of the gateway and may comprise plural interfaces, as in FIG. 2. Similarly, the network interface 14 might be matched to a CEO network, a PROFS network, and so on. The message transfer interface 15A forms a second port communicating with the messaging backbone bus 15B.

The interfaces 14 and 15A are linked by a software interface 44 which is identical in all gateways. This interface 44 comprises a library of core routines which provide communication between the message transfer interlace 15A and the software interface 44. Although this core library could be and is always functionally equivalent to a single library it may, for convenience, be handled as a plurality of separately maintained libraries. In the present embodiment these comprise libraries denoted TOOLS, GUI, ART. GUI represents a General Unpended Interface and is fully described below. ART represents ASN.1 (ISO standard) Run Times library routines, i.e. routines for encoding data in a format in accordance with the ISO ASN.1 standard, hereby incorporated by reference. These routines are used by TOOLS to build PDUs, specifically 1988 X400 PDUs.

The non-specific software interface 44 is matched to the network interface 14 by a library of specific routines 45. The specific routines comprise the routines necessary at higher level to control the flow of messages, in accordance with the nature of the gateway which they serve. TOOLS on the other hand provides "tools" or services common to all gateways. More specifically TOOLS routines impose the X400 1988 format on the PDUs constructed by ART, send the messages, receive message confirmations, receive messages, send confirmations, handle the disk saves, submission to the directory service and to the document converter and may perform other functions required in common by the gateways The gateway communicates via the messaging backbone 15 with the document converter 46 and with the main directory service 48. It may optionally include its own sub-directory library 49.

II NETWORK COMMUNICATION

Figure 4:
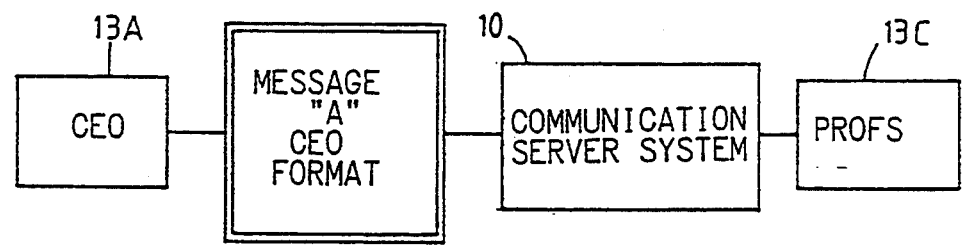
FIGS. 4 and 5 illustrate the transfer of a message between two different networks.
Figure 5:
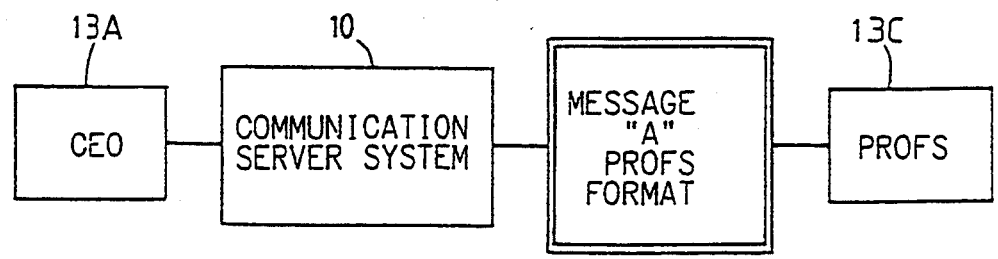

When a user on one network sends a message "A" via the corresponding gateway to a user on a different network via the gateway corresponding thereto, the network communication system 10 converts the message from the specific format of the source network, here assumed to be CEO, to the different specific format of the destination network, here assumed to be PROFS. FIG. 4 shows the CEO network 13A sending message "A" in CEO format to the system 10. Then (FIG. 5) the system 10 converts the message to PROFS (SNADS) format and sends it to the PROFS network 52.

This process typically involves address translation, handled by the directory service 48, protocol conversion, handled by the specific routines 45, and document format conversion handled by the document converter 46. A second example will now be described in more detail. In this example the scenario is that of a message arriving from an external 1984 X400 network (say one provided by a PTT) and leaving via a fax card into the telephone network.

Figure 6:
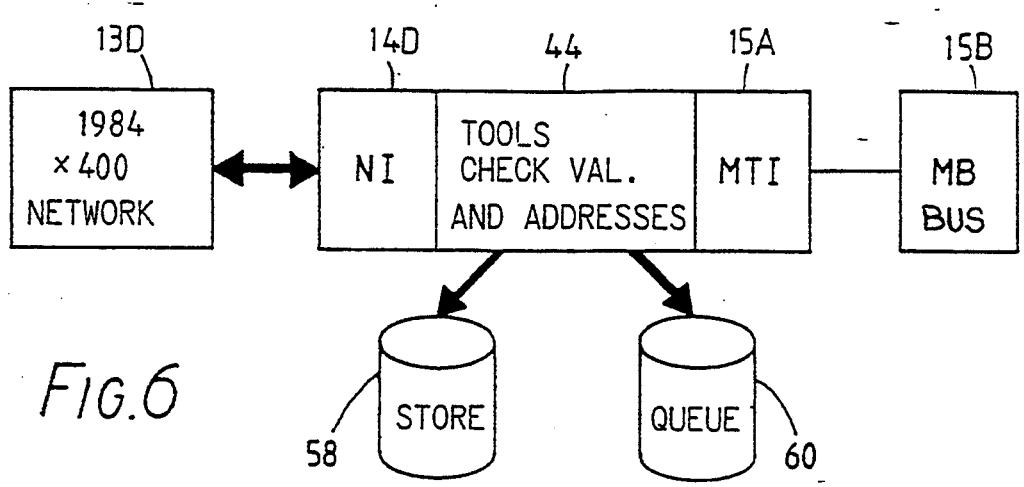

FIG. 6: The X400 network 13D opens a connection to the 1984 X400 gateway 12D. It transfers the message from the PTT network to the X400 gateway 12D. The message is then saved on to disk, namely in the disk farm 22, as indicated at 58, (so that even if the system crashes, the message will not be lost).

The message is checked for validity and the addresses of the recipients are checked to ensure that the recipients are "within" the network communication system. These procedures are well known per se in communications networks. The message is then placed on a queue of messages to be processed further, indicated at 60. The message is acknowledged to the remote (PTT) system 13D.

Figure 7:
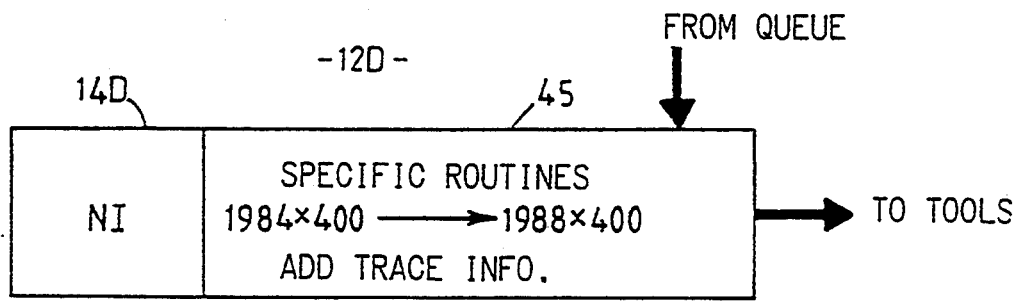

FIG. 7: The message was received in 1984 X400 format and needs to be converted into 1988 X400 which is the internal format used by the system. Trace Information is added in accordance with conventional communications techniques. This information is used to track a message through all the systems which it traverses. It is used to detect looping messages (they pass through the same system twice). The message is then passed to TOOLS in the software interface 44.

Figure 8:
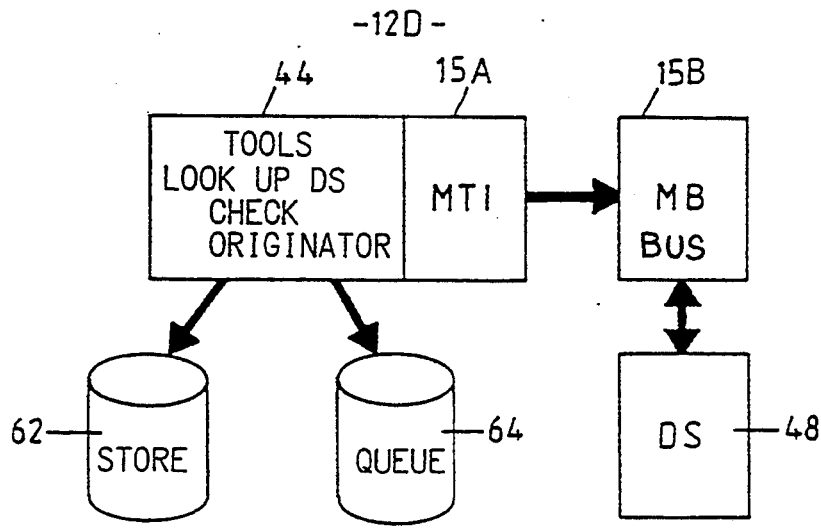

FIG. 8: The recipients are looked up in the directory service 48 to see which gateways the message should be sent to. The originator is checked to see if he is allowed to use the network communication system. This use of the directory service is conventional per se.

The new copy of the message is stored away (62) and placed on the queues (64) for the other gateways.

Figure 9:
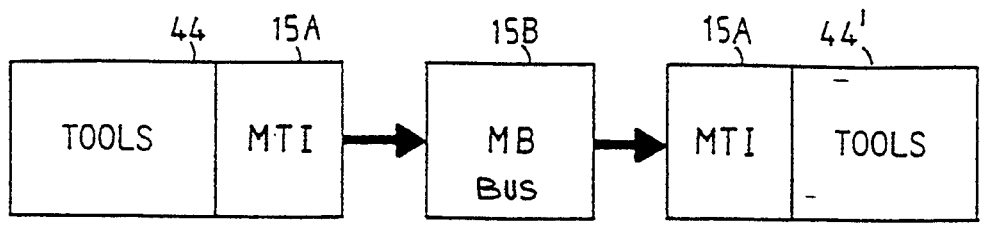

FIG. 9: The message is now transferred to the peer TOOLS in the other gateway 10 (in this case Fax). This is done using what is referred to as a remote operation, meaning that a command (SUBMIT_MESSAGE) and some data (in this case the message itself) is transferred. A sequence number is also sent over in order to prevent duplication of messages.

The message is thus now in TOOLS 44' of the FAX gateway 12E. In FIGS. 9 to 12 the elements of this gateway are distinguished by added primes.

Figure 10:
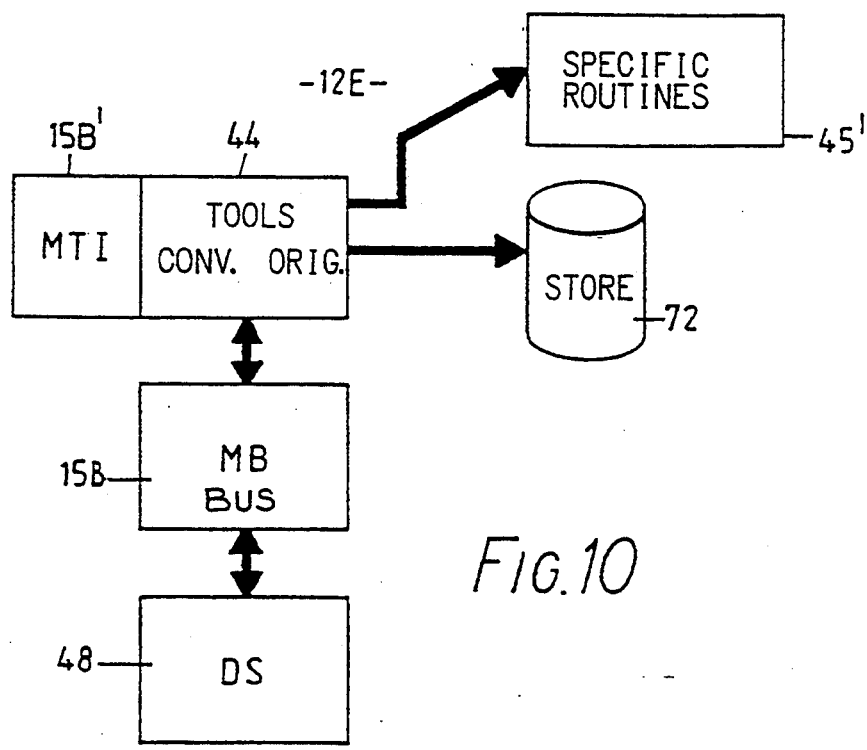

FIG. 10: The message is stored again (72). The designation of the originator is converted (CONV. ORIG.) into human readable form for use as a CSID (the string that appears at the top of the fax page). More call barring checking is done to bar calls which are, according to the directory, not permitted to the addressed recipient from the call originator in question.

The message is handed to the specific software routines 45' of the fax gateway 12E. All action now takes place in the fax gateway 12E.

Figure 11:
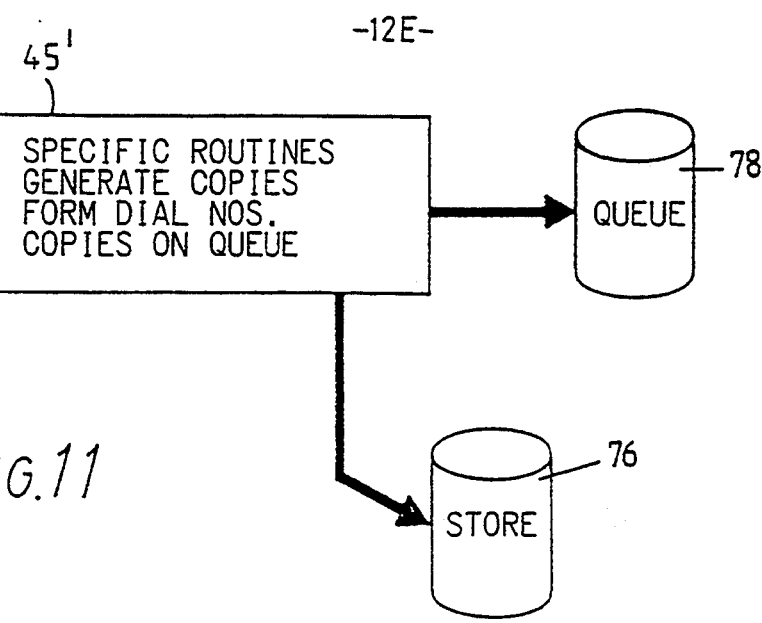

FIG. 11: The copies of the message are generated and stored (76) one per recipient and the dialled numbers are formed. The format of fax addresses that are passed around are 9 <country code> <national number>. This is converted into a sequence of digits to dial.

Each copy is now placed on a queue (78) to be sent when an outgoing line (fax card) becomes free.

It will be noted that the message is repeatedly saved to disk. This is not a serious overhead because the majority of the message is left on disc and the different "saves" are effected by constructing pointers to the stored message proper. There is some management to ensure that, when a copy is 'deleted', the stored message itself is not deleted until the last user releases it.

FIG. 12: For each copy of the message, the specific routines 45' wait until a fax card 82 becomes available, (signalled as an event), and then transfers the message via the fax network interlace unit 80 to the fax access unit, i.e. PC 82 with fax card. This is a specific example of when use will be made of GUES—generic unpended event-handler service—which is discussed in detail below.

There then takes place standard operations within the PC 82. The message (which is still in internal encoded form) is converted into text. The header is formatted with dates etc. in the local language. The message is then passed to the fax card. The fax card dials the number supplied and starts to transmit the message, converting from text into the black and white image as it goes. At the end of the call, the fax card returns the CSID (the called subscriber identification) to the PC. The fax gateway 12E is told the result of the transmission including the duration and the CSID.

Other operations may then take place on the fax gateway 12E. The message (which was still being stored) is retrieved to check if the originator requested any notifications on completion of the message (good or bad). The reports are generated and handed to TOOLS for transmission back to the originator. Accounting records are now recorded on disk for charging.

FIGS. 6 to 12 are concerned with the transmission of a message from the standard 1984 X400 network to a fax access unit. A message passing in the opposite direction will be handled in a complementary or inverse manner which will be apparent from the foregoing description.

III GENERAL UNPENDED INTERFACE

This section consists of the following chapters:
Chapter 1: Introduction
Chapter 2: Environment
Chapter 3: The User's Model
Chapter 4: Functionality
Chapter 5: Examples of GUI Task Interactions
Chapter 6: GUI Timers (GUTS)
Chapter 7: GUI Event Handlers (GUES)
Chapter 8: GUI Specification
Chapter 9: GUTS Specification
Chapter 10: GUES Specification
Chapter 11: GUI Programming Example
Chapter 12: Internal Structure
Chapter 13: Data Structure Specification
Chapter 14: GUI and Communications Server System
Chapter 1 Introduction
1.1 Outline of GUI.

GUI provides generic mechanisms for handling Request/Response Interactions across an interface, external events, and timers. It also provides an environment in which applications can use unpended services in order to support multiple threads of processing on a single path. These mechanisms allow an entity to request a service (provided by GUI in the case of timers, or by another entity in other cases), and later be notified of its completion without pending while the service provider's routine fulfils the request. Hence the application can perform other useful processing, in parallel with the service provider's processing of the unpended request.

In a complex product such as a communication server system there are inevitably many separately designed modules, all providing service interfaces to their users and all of which must coexist peacefully. The traditional problem is that each module has its own set of rules and restrictions which its user must conform to and there may be incompatibilities between the requirements, which take much effort to resolve, when all the modules are put together, with a high risk of bugs being left in the system.

For example, a library which needs to wait for external events might traditionally have had a routine which the application must poll from time to time to see if anything had happened. This is perhaps tolerable with one library but with say a dozen libraries, a lot of time is going to be spent just polling them all. What is worse, traditional libraries tend to make exclusive use of shared resources, whose use must accordingly be carefully coordinated so that all the modules in the process can operate together. This would result in the modules working in isolation but not when they are integrated.

GUI solves these problems by taking charge of all resources (timers, signals and other external events) and providing services which all the various libraries can use in order to access the resources in harmony. Because GUI is the only direct user of the underlying resources, there are no problems with integrating the separate modules.

An additional benefit is that, because all external events arrive through GUI (and are then dispatched to the various modules) there is no need to poll all the libraries continually. In fact, in an application which is fully based on the principles of GUI, there is no polling at all, because GUI automatically waits for all possible external events whenever there are no jobs to run. This results in applications which use virtually no CPU time when they are not processing a message. This is certainly not true with many traditional application architectures.

In general terms, the way in which GUI works is as follows. Instead of programs being written as sequential code, with various calls and jumps, the main structure of an application makes requests of service providers, which schedule jobs or notifications onto queues.

Jobs or notifications may be categorised as follows:
  Data returned by a service routine
  Notification that an external event has occurred
  Notification that an interval of time has elapsed
  Inter-process communication (IPC), that is to say a message passed between two computer processes.

In principle there need only be one job queue but an application can set up multiple queues with different priorities and select the queues on to which it or service providers place jobs, as a means of controlling priority of execution of jobs. The application (user) calls a run routine gui_run() when it is free for jobs to be run. Gui_run() will then run scheduled jobs off the queues (a) in order of queue priority and (b) in first in first out order so Ear as each queue is concerned. Applications must not themselves pend. When an application is otherwise idle, it should call gui_run(), with a pend option, whereby gui_run() pends until a job is scheduled by an inter-process communication (IPC), an event-handler service, denoted GUES below, or a tinier service, denoted GUTS below. This assumes that, once idle, the process has nothing further to do until an IPC or external event arrives or a timer goes off. This is the situation which obtains with a communications server system where activity is initiated in response to events, such as "message coming in", "fax card ready" and so on, or at timed intervals. Such events are what might be termed hardware events, signalled by a change of logical state on a handshaking line, for example. IPCs can be regarded as software events.

Input events are represented by calls to user routines with specified parameters, which can indicate the event that occurred. These events are placed on the queues by calls to gui_schedule() and picked up by the main task when it calls gui_run(). External events are not the only things which can be scheduled with GUI. Unpended request completions are another obvious class of user routines which can be scheduled and any routine, whether library or user, running within the main task can schedule any general processing which it needs to do and this will get run some time later.

When an application is doing its own processing it must return to gui_run() sufficiently frequently to avoid disruption of the system, e.g. by causing timer inaccuracy or affecting network usage or user response times. The application may be said then to poll GUI but it is important to recognise that it only has to poll the one "event handler", not many handlers as in the conventional approach.

The application main task allocates a queue, denoted by a queue identifier or quid, for each level of priority which it requires. When library routines are called they have to be told the quid onto which they must schedule their jobs. In general, external events will be given high priority quids while general internal processing (especially that involved in housekeeping and accounting operations) can be given low priority quids.

The structure of an ideal application can be expressed as the following outline of a main routine:

```
main ()
{
    initialise self;
    initialise GUI;
    allocate quids, for required priorities;
    initialise all libraries;
    maybe schedule initial jobs and start any regular timers;
    do forever
        gui_run(PEND)
}
```

The significance of the pend option for gui_run will be explained below, section 4.1.4.

All of the external event processing and internal library processing gets done as scheduled jobs out of the call to gui_run(). External events are being scheduled by GUES and in response to IPC's. Internal library processing gets scheduled either out of the initial unpended request routine or out of jobs run because of external events destined for internal service providers, denoted GCSP's below. In this ideal example, all of the application's own processing gets run as scheduled jobs. This requires the application to schedule the first job or jobs it needs to do before it calls gui_run() and it can always schedule further jobs at later times. This structure has the advantages that the process automatically sleeps within gui_run() when there is nothing to do and that the application code is integrated into the GUI mechanism. However the invention also optionally provides "wakeup" routines which enable a user routine to wake up pended gui_run() and enable GUI to wake up an idle user loop, as explained below.

1.2 GUI and the operating system.

GUI makes it possible to write applications in such a way that they are portable between apparently incompatible operating systems such as VS and UNIX. What is said about UNIX applies in essence to MS-DOS, with the difference that MS-DOS uses real, hardware interrupts whereas UNIX uses software interrupts (signals). The fundamental difference between VS and UNIX is that VS processes are multi-threaded while UNIX processes are not. Under VS there can be multiple threads (VS tasks), all executing apparently concurrently within the same process address space. On the other hand, under UNIX there is only one thread running in a process, although it can host another interrupt-level path by the use of software interrupts. However VS does not have a documented mechanism for software interrupting the main task of user processing, in contrast to the UNIX routine kill(). Under VS an application uses a dedicated VS task to await external events.

In spite of these incompatibilities an application written within GUI can run under VS or UNIX, provided that the features particular to the two operating systems are not used. Thus no use must be made of VS multiple threads by the GUI user and no use should be made of UNIX interrupts. On the contrary, the application must be written with a single main task and interrupts or events must be handled by the event-handler services within the GUI framework.

In writing "server" applications, such as a network communications server, it is highly desirable to be able to process many items (messages) in parallel within a single process, since so much time is spent waiting for events, during which time efficient use of resources can be made by processing other messages. GUI provides an environment which can handle this requirement and which is the same regardless of the underlying operating system. Known application packages which use resources efficiently to process multiple messages are specific to one operating system. A specific example of how GUI is used within the communication server system described above is given in Chapter 14 of this description.

1.3 Terminology

GUI typically provides an interface between a library, written by one set of programmers to provide a service, and some user code, written by different programmers to make use of the service. Such library code which uses GUI is called a GUI-Conformant Service Provider (GCSP). The user code is called, simply, The User.

Throughout this description, routines provided by GUI will be indicated by names beginning "gui_" (e.g. gui_schedule). Routines provided by a GCSP will be indicated by names beginning "GCSP_", whilst routines written by a User will begin "user_".

Following is a list of terms used in this disclosure:

| | |
|---|---|
| Pend | A routine pends if its processing path comes to a halt, whilst awaiting an external event. For example, many VS system calls cause the calling task to pend while the call is run on a VS path. |
| Unpended | A routine which does not pend while awaiting external events is said to be unpended. |
| Task | A thread of processing, which is logically separate from threads performing other processing. |
| Main Task | The main processing thread within a process. |
| Path | A thread of processing, which is physically separate from threads performing other processing. Paths may be Parallel, as in the case of multiple VS-Tasks, or Nested, as in the case of a base level path and an interrupt level path. |
| VS-Task | A path, in the above sense, which is a physically scheduled entity, created by a ?TASK system call, under the AOS/VS operating system. |
| GCSP | GUI Conformant Service Provider. A library which provides a service conforming to the GUI rules and formats. |
| User | Code which makes use of GUI, in order to request services of a GCSP. |

Chapter 2 Environment 2.1 Hardware and OS Environment

An aim of GUI is to provide an interface which is moderately independent of the OS and Hardware environment. This means it must work under AOS/VS on an MV, MS-DOS on a PC, and UNIX on an MV or other hardware, for example.

MS-DOS and UNIX are single-threaded. This description speaks of multiple tasks, with one or more main tasks, and some event wait tasks. In the MS-DOS and UNIX environments, this terminology equates to a Base Level "main task", and a set of Interrupt Level service routine "tasks". Although GUI allows a user to have several "main tasks", it should be noted that this feature is not available under MS-DOS or UNIX. It is recommended to have only one main task, even under AOS/VS, due to the possible requirement for a future port to another OS. The possibility of having multiple main tasks is intended to assist programmers who are converting existing multi-tasked programs to use GUI. Whatever the physical environment, GUI is constrained to run in a single address space. It does NOT provide an interface between entities running in separate address spaces, for example in two different VS or UNIX processes.

2.2 Language Bindings

For reasons of efficiency, (particularly on the PC) the standard GUI library is designed to be called with C calling conventions (i.e. call by value). GUI calls all user-supplied routines with this same convention.

Under AOS/VS, languages such as PL/I use a call-by-reference calling convention, called the External Calling Sequence (VS/ECS), which is incompatible with the C calling convention used by GUI. This means that GUI cannot be called directly from PL/I, and that PL/I routines cannot be scheduled using gui_schedule().

If the need arises, a PL/I version of GUI could be implemented, by adding a thin layer of C code on each side of GUI. One layer would provide ECS-callable routines, which convert the parameters, and then call the standard GUI routines. The other layer of code would be required for any PL/I routine which needs to be gui_scheduled(), and would consist of a C routine which is actually scheduled, and which then calls the PL/I notification routine with the modified parameter format.

Chapter 3 The User's Model

The model of a GUI user is an entity (some user-written code) which wishes to make requests of a Service Provider, in an unpended manner.

To make a request, the User calls a routine which specifies the service which it requires. Since the actions required to implement the request may be lengthy, the user does not want to wait for the completion there and then, but rather, wants to be told when it is complete. This is the basic concept of an unpended request.

The way in which the User is told of the request's completion, is by a user provided Notification routine being called, usually by GUI.

3.1 Unpended Request Example

Figure 13:
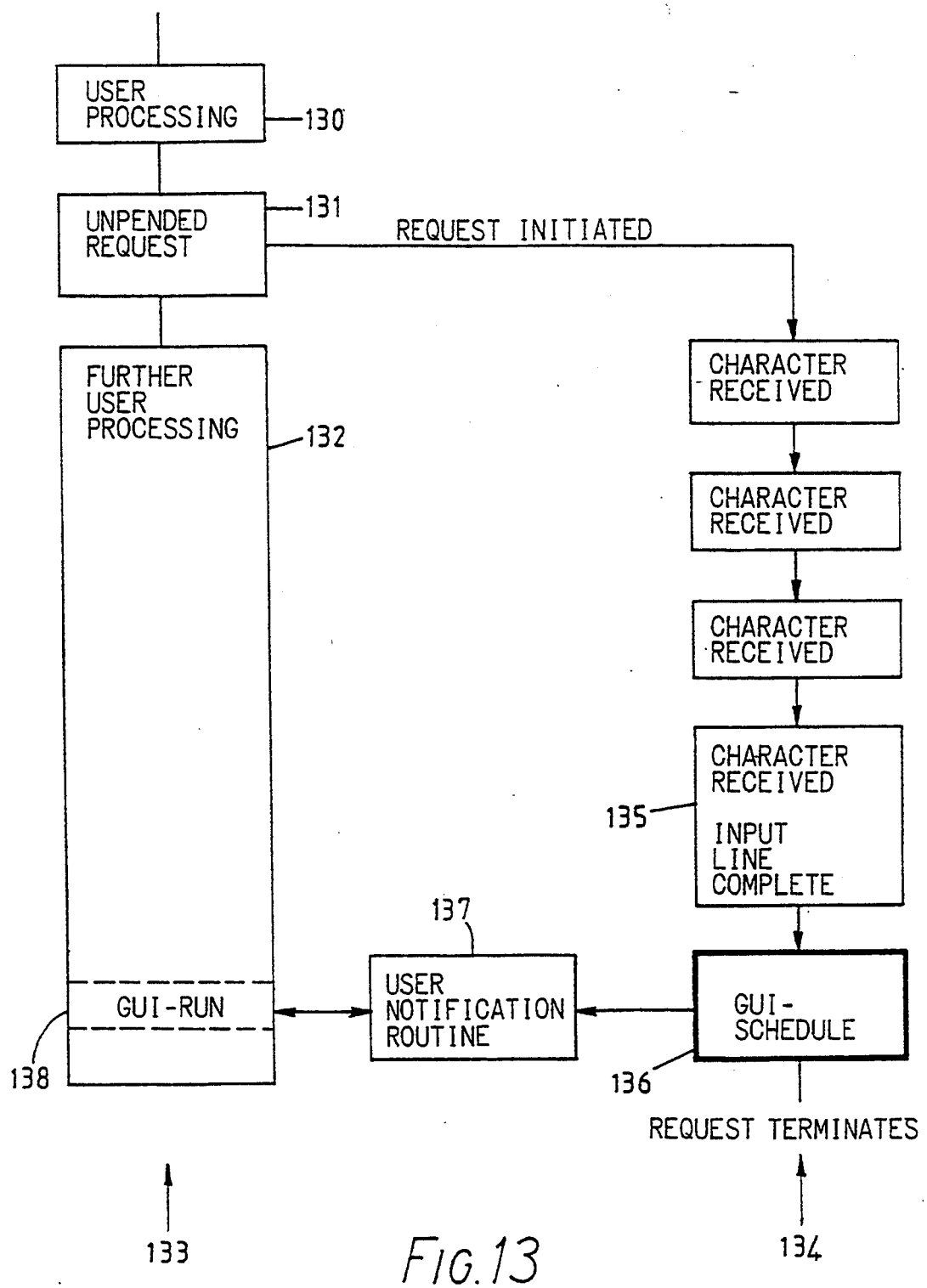
FIG. 13 illustrates performance of two concurrent tasks under GUI (general unpended interface)

Consider the following example, which is illustrated in FIG. 13. A User 130 wants to read a line of input from a keyboard, but does not want to pend if input is not yet available, nor repeatedly poll for the arrival of input. This functionality can be satisfied by an unpended request, provided by a GCSP.

The GCSP writer provides a Request routine 131, say "GCSP_get_line()", which takes as an argument the address of a User notification routine 137 to be called when the input is available. The Request routine initiates the service and then returns, without pending. There are many ways in which the request may be initiated by the GCSP Request routine:

1) It may set up an interrupt handler, which saves the input character each time a keyboard interrupt comes in, until a line is available.
2) It may spawn a process which will do a pended read, and signal the main process when a line of input has been received.
3) It may spawn a task, which does a pended read, and calls the
Notification routine when the input is complete.

Whilst these are just some of the possibilities; (1) is typical for MS-DOS, (2) for UNIX, and (3) for VS.

Once the request routine has returned, the User can perform any further processing 132 it has to do but such further processing must include periodic calls to gui_run(). There are now two separate threads of processing (or "tasks") established for this user: (i) the main task 133, and (ii) the request processing task 134, which may be processing at interrupt level, in another process, or in a separate VS-style task. When the request task detects the completion of the request (i.e. when a line of input has been received as indicated at 135), it calls (136) gui_schedule to place the User's Notification routine 137 on a quid, with the result of the request (a line of input). When gui_run() is next called, as indicated at 138, the notification routine is taken off the quid and the user processing task has acquired the line of input which it requested.

It is convenient to say that the notification routine or job is put on to and taken off a quid. What is actually put on to the quid (even more precisely on to the queue identified by the quid) is the address of the notification routine and any arguments for this routine, as subsequently explained with reference to FIG. 24. In the case of FIG. 13, the arguments are characters of the input line.

Whilst all of this example can be achieved without GUI, other cases may not be so simple. In any case, GUI provides a framework which aids both the User-writer and the GCSP-writer in implementing such mechanisms, in a way independent of the operating system which is used.

Chapter 4 Functionality

This Chapter starts by describing the routines provided by GUI, in order to support an unpended environment. It then goes on to describe the routines required of a GCSP, and GCSP User, in order to support an unpended interface.

4.1 GUI Provided Routines

The library portion of GUI (as opposed to the Rules governing its usage), provides a mechanism for scheduling arbitrary user routines, for running at a later time. The generic term used for one of these scheduled routines, is a Job.

GUI provides a routine for queuing up Jobs (gui_schedule), and a routine to be called when a user is ready to run these Jobs (gui_run). For additional flexibility, GUI supports multiple queues of Jobs, which can have different priorities associated with them at allocation time.

4.1.1 GUI Initialisation Gui_initialise ()

This routine takes no parameters. It should be called by each component (i.e. each GCSP and User), before any other GUI routine is called. GUI ignores all but the first initialisation.

4.1.2 Queue Allocation

As mentioned above, GUI provides multiple queues of scheduled Jobs. This enables Users to specify the relative priorities of Jobs, and to collect Jobs which form logical classes onto a queue which is separate from other logical classes. Each GUI queue has a QUeue IDentifier (QUID), which is assigned by GUI, when a queue is allocated:

gui_allocate_quid (priority, user_wakeup, quid_ptr)

The parameters to this call are as follows:
* priority—Specifies the priority for running Jobs off this queue, relative to other queues.
* user_wakeup—Optionally specifies a user supplied routine, which GUI will call whenever there are Jobs available for running on this queue.
* quid_ptr—GUI fills in this parameter, with the queue identifier which it assigns to this queue.

Each queue which is allocated has an Owner which is the path which allocated it.

Under VS, there could be multiple paths (VS-Tasks) capable of allocating GUI queues, although this is not recommended, for reasons of compatibility explained above. Under single-threaded operating systems, only the main thread is allowed to allocate queues (i.e. they may not be allocated from interrupt level).

Any path may schedule Jobs onto any queue, however, only the owner can run Jobs off that queue. This will be described further under the section on 'gui_run()'.

4.1.3 Job Scheduling

GUI provides a routine, which Users and GCSPs can call, in order to cause a specified routine to be called, with given arguments, and (for VS) on a particular task:

gui_schedule (quid, routine, arg1, arg2, arg3, arg4)

where the arguments are as follows:
* quid—The queue onto which 'routine' should be scheduled.
* routine—A pointer to the routine which GUI should call.
* arg1 . . . arg4—Arguments with which to call 'routine'.

This GUI routine does not pend, and as a result of this call, GUI will call 'routine', when the owner of the specified queue calls gui_run. The routine will be called thus:

(*routine) (arg1, arg2, arg3, arg4, quid)

The 'argN' parameters can each be big enough to contain a pointer (32 bits on an MV, 16 or 32 bits on a PC), however, GUI does not indirect through them. Hence the parameters may be used to pass either integers, or pointers, as required. In the latter case, the caller of gui_schedule must ensure that the pointer remains valid, until the scheduled routine has actually been run. GUI will only copy the values of the arguments themselves between stacks, and not anything they might point to.

The 'quid' identifies a particular GUI queue, onto which the Job should be scheduled. This provides control over the relative priorities of scheduled Jobs, and determines the sequence in which Jobs will be run when the owner calls gui_run.

In a VS environment with multiple main tasks, the quid also provides control over which VS-Task the Job will be run on. Note, however, that this is not a recommended configuration

4.1.4 Running Jobs

In order for GUI to be able to run a Job which has been gui_schedule'd, it must be able to gain control of the thread owning the queue onto which the Job was placed. For this purpose, GUI provides a routine which a user can call from a main thread, in order to run any Jobs which are scheduled on queues owned by that thread:

gui_run (flag) where the arguments are as follows:
* flag—The flag says whether or not GUI should pend the thread, if there are no scheduled routines to run.

Jobs are selected, on a priority basis, from the queues owned by the calling path (see the description of 'gui_allocate_quid()'). Within a single queue, Jobs are run in FIFO order.

If 'flag' is set to NOPEND, then GUI will check for a routine to run, and return immediately if none is ready. If there are routines to run, then GUI will run one of them, and then return. The value returned from gui_run() will indicate whether or not a job was run.

If 'flag' is set to PEND, then GUI will pend the calling thread until there is a routine ready to run. After running any routines which become ready, GUI pends the caller once more.

4.1.5 Thread Control

Since, in the pended case, GUI would never return from gui_run, another routine is provided which the User may call in order to force a thread to return, if necessary:

gui_wakeup (quid)

This wakeup routine does not pend. Hence, it can be called from any path, including from a Job which is already running on the specified quid. This call will cause the path which owns the quid, to return from gui_run at the first opportunity (i.e. immediately, if it is pended awaiting Jobs or when the current job completes, if one is being run). Using the pend/no-pend option of gui_run, the User has the choice of either pending within GUI whenever it is idle, or else polling for notifications to run from its own idle loop.

As an additional option, in the case where the User prefers not to pend within gui_run, it may supply a wakeup routine for GUI to call, whenever GUI requires control of a thread, in order to run a Job on a quid owned by that thread:

user_wakeup (quid)

The address of this routine is specified as a parameter to gui_allocate_quid, for each quid allocated. This mechanism gives the user the option of not polling for notifications to run, but of being told when they are available. In this case, whenever GUI calls 'user_wakeup', the User must call 'gui_run', with the specified task, in the near future, i.e. as soon as it is in a position to do so.

Ideally GUI is programmed using only the gui_schedule() and gui_run() routines. However the optional wakeup routines can be valuable, since they enable Users with different tasking structures to use GUI in the way most convenient to their own requirements. For example gui_wakeup() can be useful in implementing user interface programs, e.g. adding entries to the directory of the communications server system. Specifically, gui_wakeup() may be called when returning from the GUI environment to a more conventional one (handling the user interface) when (in this example) a directory request completes.

4.2 GCSP Provided Routines

This section describes the routines which a GCSP must supply, in order to provide an unpended service across GUI.

A GCSP provides Request routines, to be called by the User, in order to initiate the services which the GCSP provides.

Each of these Request routines, must obey the following rules:
* It must not pend.
* It must arrange for a User-supplied Notification routine to be called when the request is complete.

To prevent problems of stack run-away, and to avoid the user's notification routine being called before the request routine returns, the GCSP must NOT call the notification routine directly from the request routine. It is permissible, however, for a GCSP to call the notification from one of its own routines, which it has previously scheduled.

* It must provide a mechanism by which the User can specify, if it so requires, onto which quid the Notification routine should be scheduled. These requirements can be satisfied, by the GCSP User specifying a Notification routine, to be called on completion of the unpended request, and a GUI quid, onto which the GCSP can schedule the notification.

In the case where the service provided by the GCSP is strictly of the Request/Response type, a typical Request routine may be of the following nature:
GCSP_Request (Nfunc, quid, arg1, . . . argn). where the arguments are as follows:
* Nfunc—Pointer to the caller's Notification routine.
* quid—A GUI quid, onto which 'Nfunc' will be scheduled.
* arg1 . . . argN—Additional arguments, specific to request.

If the GCSP so decides, then it may use any other mechanism it likes for specifying 'Nfunc' and 'quid' (e.g. they may be hard-coded, or decided at initialisation time). In particular, the interactions across the interface need not be strictly of the Request/Response nature, since the GCSP can, at any time, schedule any user routine to be called.

4.3 User Provided Routines

As indicated above, the User supplies Notification routines, for all requests it makes. These are the routines which will be called, in order to inform the user of a request's completion. At some time after the User calls the GCSP Request routine, either that routine, or else some other GCSP or GUI routine, will call the User's Notification routine (Nfunc, in the above example).

This Notification routine must obey the following rules:
* It must not pend.
* It must be prepared to be called on any path, unless it has arranged otherwise with the GCSP (e.g. by specifying a quid onto which the notification should be scheduled).
* It must not call gui_run(). In order to prevent problems of stack run-away, calls to gui_run may not be nested.

Considering the example Request routine above, where the GCSP uses GUI to schedule the User notification routine directly, that routine would be called thus:
(*Nfunc) (arg1, arg2, arg3, arg4, quid); where the arguments are as follows:
* arg1, . . . arg4—Arguments specific to Notification.
* quid—The GUI quid on which 'Nfunc' is being called.

No use can be made of a return value from Nfunc, since it may not be called directly from the GCSP, nor on a stack which returns to the GCSP. Unless the User has arranged with the GCSP, for Nfunc to be called on a specific quid, it may be called on any path.

4.4 Queuing of Scheduled Notifications

On a per-quid basis, GUI guarantees to run any queued Jobs in the order in which they were scheduled. There is no sequencing enforced between separate quids. If there is a Job scheduled to run on a particular high priority quid, and the User calls gui_run with the path which owns that quid, then GUI will run that Job. This will happen regardless of the fact that notifications may have been queued on other lower priority quids, or even on higher priority quids which are owned by another path, for longer.

Chapter 5 Examples Of Possible GUI Task Interactions

Any GUI user has one or more "main tasks", where a main task is defined to mean a path which does user processing, and is allowed to own GUI quids (i.e. it excludes event-wait-tasks and interrupt handlers). Although a main task may perform lengthy operations, and even pend on operations such as disc I/O, it is not advisable for a main task to pend on a potentially infinite wait (e.g. pended, non-timed-out, terminal I/O). Failure to observe this advice may result in severe disruption of the entire GUI environment, since it may become impossible for GUI to 'wake up' a main task, in order to run a notification.

As described in Section 4.1.5, there are two basic methods of thread control provided by GUI, supported by the 'flag' on the call to gui_run. This section describes possible uses of these mechanisms, and illustrates the inter-task relationships for each.

The two mechanisms are distinguished by the location of the idle "wait-point", either within GUI, or within the User.

5.1 Wait point within GUI

This mechanism is supported by two calls to GUI routines:
* gui_run (pend);
* gui_wakeup (quid);

The user calls gui_run() on its main task thread, and with the pend option selected, when it is idle. When a Job becomes available, on a quid owned by the calling path, GUI will call the scheduled routine, from gui_run.

If the user needs to regain control of its main task thread (either because another task of its own, or a GUI Notification call, has queued some work for it), then the user can call gui_wakeup(), which will cause gui_run to return to the main task as soon as possible.

If the user needs to control the threads of more than one main task in this way, then the 'quid' argument can be used to uniquely identify the owning path.

Figure 15:
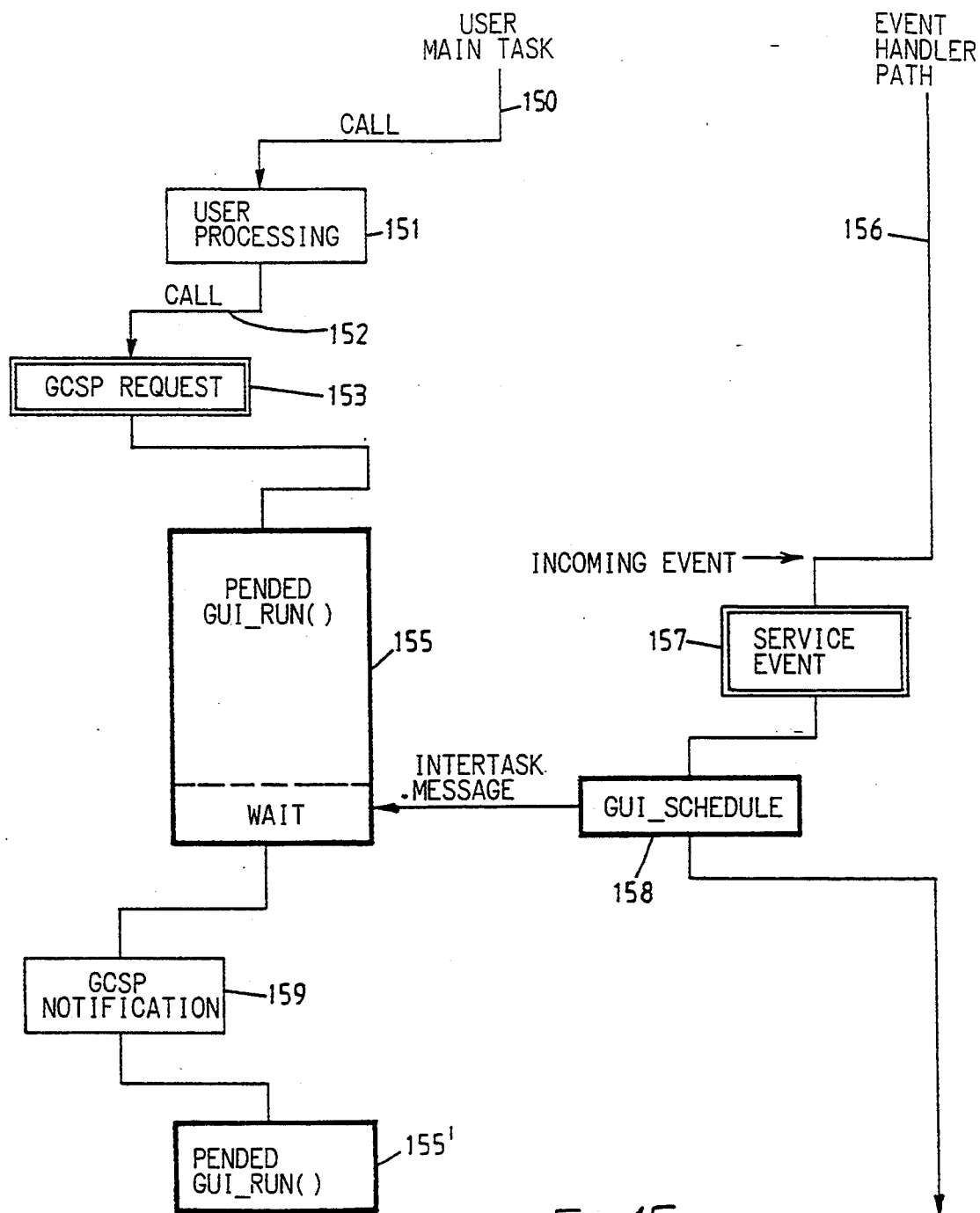
Figure 16:
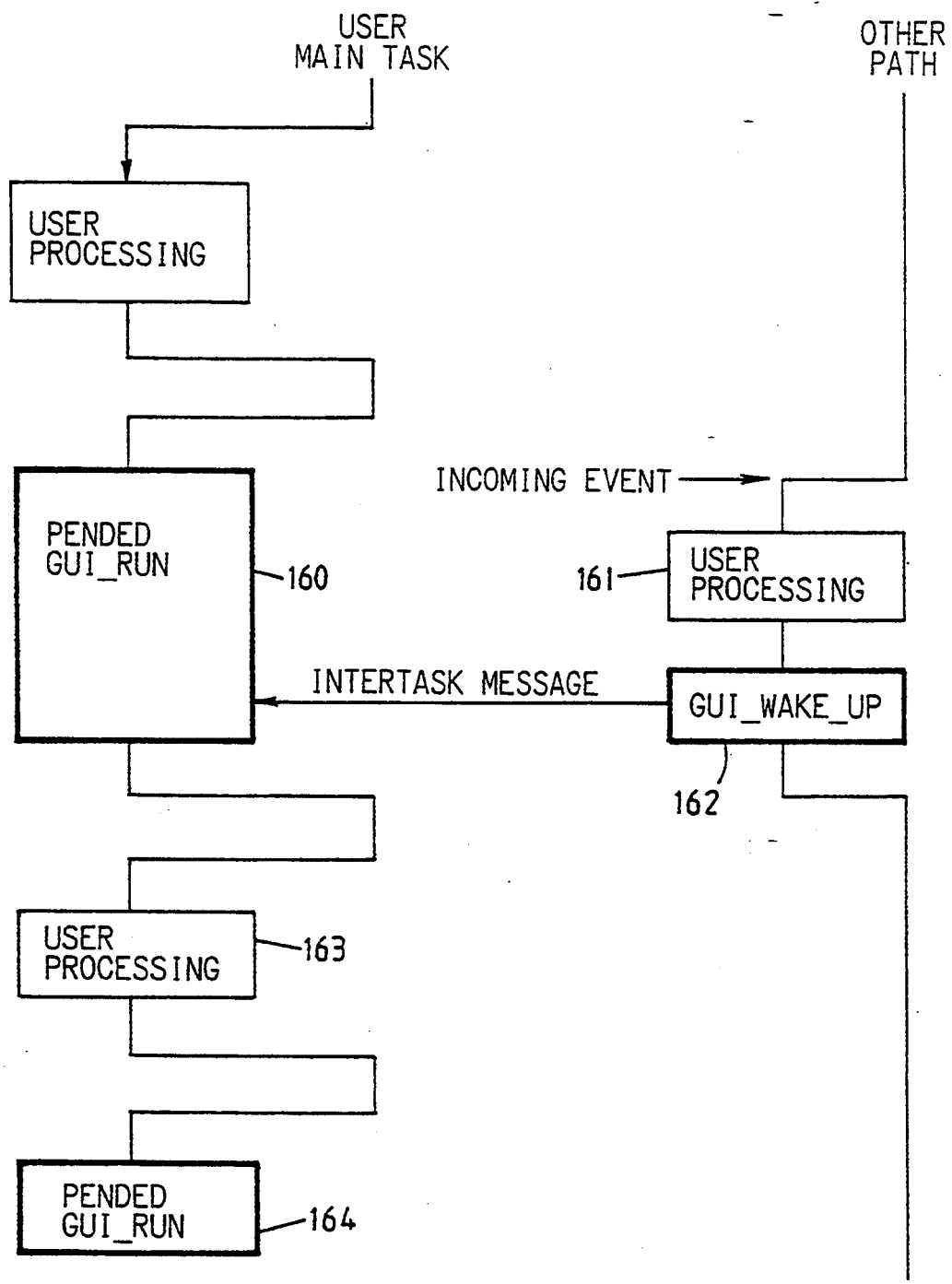

FIGS. 15 and 16 illustrate the flow of control, and task interactions for this mechanism, using the conventions set out in FIG. 14. Thus FIG. 14 shows three different kinds of box used to denote GCSP routines, USER routines and GUI routines and the meanings of the left, right and down axes, namely CALL, RETURN and TIME respectively. Note that these figures, and the descriptions below, assume there is just one main task. The underlying mechanism is not affected by this assumption but it simplifies the discussion considerably.

Pended gui run, resulting in User Notification

FIG. 15 shows the use of the pended gui_run() routine, resulting in GUI calling a GCSP notification routine, which has been scheduled to run on this task.

Proceeding from the top of the diagram downward, the user starts by doing some of its own processing on the main task thread 150. During user processing 151 the user makes a call 152 to a GCSP Request Routine, shown here as GCSP_Request 153. This routine does some processing, perhaps initiating some activity, and then returns.

When the user is otherwise idle, it calls gui_run() 155 with the pend option, i.e. gui_run(pend), in order to give control of the main task thread to GUI.

Within gui_run(), GUI checks for any notifications to run, and, assuming there are none, waits to be poked by either gui_schedule, or gui_wakeup. Some time later, a path 156 initiated by the GCSP receives an incoming event. Simple examples of events are "key pressed", "printer ready", "disk drive ready" and so on. Within the context of a communications server system other examples are "message coming in", "network ready", "network wishes to send" and so on. Alternatively the event may be an IPC. The path 156 handles the event (157) and, because of the GCSP request, knows that it now has a Notification to run on the main task. It therefore calls gui_schedule 158, which queues up the routine to be run, and sends an inter-task message to the main task, which is still waiting inside gui_run(). Having handed responsibility for the event to the main task, gui_schedule returns to the GCSP event handler, which, it is then assumed, goes back to waiting for another event.

The main task now wakes up, within gui_run, and seeing there is a notification to run on one of its owned quids, calls the GCSP Notification routine 159 for the scheduled call. Once the Notification returns, gui_run() goes back to waiting to be poked again (155').

Pended gui run, interrupted by gui wakeup

FIG. 16 shows the use of gui_run(pend) 160 in the main path, with the user of another path calling gui_wakeup() in order to regain control of the main task thread.

Having called gui_run() with the main task during an idle period, another path receives some event, the processing 161 of which requires the user to knock its main task off the pended gui_run().

This other path, (which may be a GUI wait task executing a user notification routine, or else any another user path), calls gui_wakeup() 162, causing GUI to release the main thread, and return from gui_run(). The user is then free to do any processing 163 it likes on the main thread. When such processing is complete, and the User is idle, it calls gui_run() 164 once again.

5.2 Wait point within User

This mechanism is implemented by a User-provided routine, and the gui_run() routine, with the nopend option:

* user_wakeup (quid);
* gui_run (nopend);

The User can do anything it likes in its main task idle loop. The User can either poll gui_run periodically, specifying that GUI should not pend if there are no calls scheduled, or it can wait for GUI to indicate that it wants control of a thread. The former alternative is what was illustrated in the example of FIG. 13. In the latter case, GUI will call the user_wakeup() routine when it wants the owner of a quid to call gui_run. The User must then call gui_run() in the near future, in order to give control of the main thread to GUI. Typically, GUI will run a Job, and then return from gui_run().

The 'quid' argument allows for the control of more than one main thread. When GUI wants to run a scheduled Job on a given quid, it will call the user_wakeup(), which was supplied when that quid was allocated. GUI will only run Jobs, on the thread of the main task which owns the quid, onto which the Job was scheduled.

Note, that although the user_wakeup routine is considered here as a single named routine, the actual routine to call is specified as a parameter to the gui_allocate_quid() call. This allows the user to specify different wakeup routines for different GUI queues, which may be useful where there are multiple separate User entities, in a single process.

Unpended gui run, initiated by user wakeup

Figure 17:
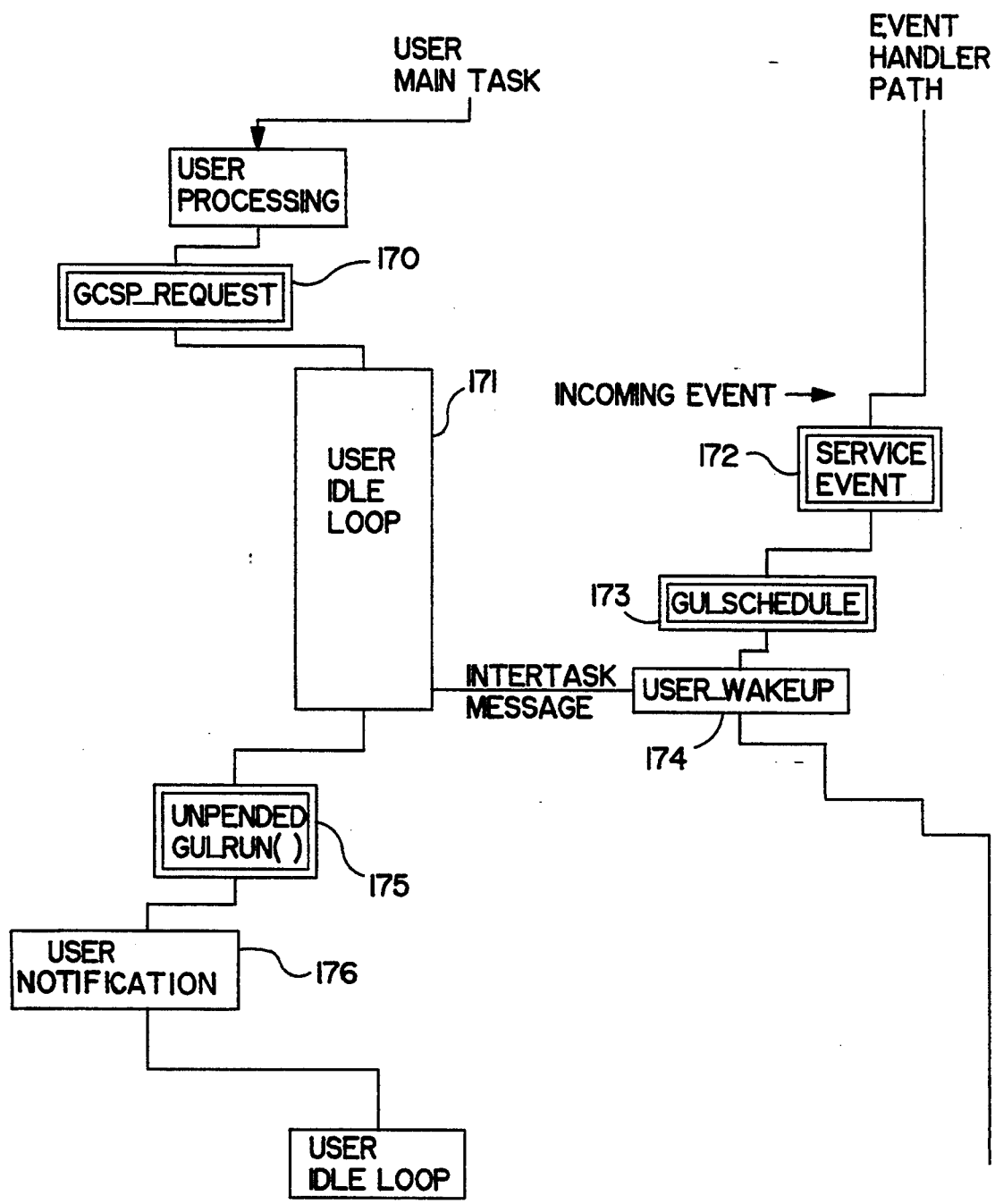

FIG. 17 illustrates the use of the unpended version of gui_run and its interaction with the user_wakeup() routine. It shows the user making a GCSP_request() 170 on its main task thread, and then entering a notional idle loop 171 (so long as the main task has a means of periodically checking for user_wakeup, there is no real need to have an explicit idle loop).

Some time later, an event arrives, which awakens a GCSP event handler 172 task. The task starts to service the event, and in this case discovers that there is a Completion Notification to run on the main task. It therefore calls gui_schedule 173, which queues the Notification internally, and calls the user_wakeup routine 174, for the quid in question.

This user-provided routine takes some action, which will cause its main task to call gui_run. The exact form of this inter-task message is a user issue. The user_wakeup routine then returns to the service routine, which in turn goes back to waiting for another event.

At some time in the near future, the user's main task picks up the inter-task message sent by user_wakeup, and as a result, calls gui_run() 175 in order to give control of the main task thread to GUI.

Within gui_run(), GUI scans its queue of Jobs waiting to be run, until it finds one to run on a quid owned by the calling path. When it finds one, it calls the appropriate user Notification routine 176. When the Notification routine returns, GUI completes its internal processing, and then returns from gui_run, handing control back to the user 177.

Chapter 6 GUI Timers

This chapter describes the Generic Unpended Timer Service (GUTS), which provides a mechanism for scheduling unpended timed events. Note, that this is not an integral part of the GUI environment. Rather, it is a GCSP, which happens to be supplied as part of the GUI library. An understanding of this particular service is not necessary in order to understand GUI itself. The Timer Service consists of a series of GUTS-provided Request routines, and a definition for a User-provided Notification routine. The following sections describe these routines.

6.1 GUTS Provided Routines

This section describes the routines provided by the GUTS, in order to start and cancel timers. A formal interface specification is given in Chapter 9.

6.1.1 guts_start_timer()

This routine is called to schedule a timer to go off, after a specified delay has elapsed. It conforms to the generalised GCSP Request routine format, as described in Section 4.1, and takes the following arguments:

* Nfunc—Pointer to the user's notification routine, to be called when the timer expires.
* quid—The GUI queue, onto which Nfunc should be scheduled. If the value NULL_QUID is specified, then the notification will be called directly from the path which detects the expiration (this will be a separate task under VS, and an interrupt handler under UNIX or MS-DOS).
* delay—A positive delay, in seconds, relative to now.
* user_ref—A user reference (typically a pointer to some user control block).
* timer_name—A number, distinguishing this timer, to the user and GUTS.
* user_arg1—An argument, for the user's benefit, which will be passed back on the call to the notification routine.

user_arg2—Another user argument, as above.

An instance of a timer is uniquely identified by the user-reference/timer-name pair. For example, if the user is implementing some networking protocol, the 'user_ref' might be a pointer to a control block for a particular connection, and 'timer_name' might indicate the event being timed (e.g. connection-timeout, clear-timeout, etc.).

The 'user ref' and 'timer_name', will be specified as parameters to the user notification routine 'Nfunc', along with 'user_arg1', and 'user_arg2'.

GUTS timers are one-off events. Once a timer has expired, and the user's notification routine has been scheduled, that timer no longer exists. If the user requires a timer to go off at regular intervals, a new timer should be started from the notification routine.

6.1.2 guts_cancel_timer()

This routine is called to cancel a previously started timer. It takes the following arguments:
* user ref—The user reference, specified on the call to guts_start_timer.
* timer name—The timer name, specified on the call to guts_start_timer.
* remain_ptr—GUTS fills in this parameter with the number of seconds remaining before the timer would have gone off.

6.1.3 guts_check_timer()

This routine is called to check how much time remains before a timer will go off. It takes the same arguments as guts_cancel_timer(), but the timer is not cancelled.

6.2 User Provided Notification Routine

As shown above, the caller of guts_start_timer provides a notification routine, 'Nfunc', which will be called when the timer expires. If we call this routine 'user_timer_expired', then it will be called as follows: user_timer_expired (user_tel, timer_name, user_arg1, user_arg2, quid) where the arguments are those specified on the original call to guts start timer.

6.3 Timer Accuracy

The accuracy of the Timer Service, will be such that timer expirations will be scheduled within +1 second of the intended time, when running on a normally loaded MV with no memory contention. However, since GUTS uses GUI for Notification scheduling, the exact time at which the Notification will be run, depends on the number of GUI notifications currently scheduled, and on how soon the User calls gui_run.

Chapter 7 GUI Event Handlers

This chapter describes another GCSP, which may be included in the GUI library, namely the Generic Unpended Event-handler Service (GUES). Like the timer service, this service is not an integral part of GUI itself. It will be a frequent requirement for GCSP's to set up event handlers, in order to wait for the completions of actions which they initiate. Such handlers are environment-specific. Under AOS/VS, they may be VS-style tasks, whilst under UNIX, they will clearly not be.

For this reason, and since many Users may require the same services, GUI provides an event registration service, which attempts to hide the details of the wait tasks from the User. Clearly, the User will be aware of the environment, to the extent that it must tell GUI what sort of event to await, but this awareness is confined to the selection of a type of event on an interface call. There is no need for a User to know the details of spawned VS-style tasks, or of Interrupt Vectors, or whatever the underlying mechanism is.

Note that in the context of this service, a "User" may be a GUI User, or another GCSP. They are both just "Users", as far as the GUES is concerned.

GUES is available only under the AOS/VS and UNIX operating systems. The actions required on receipt of MS-DOS hardware interrupts are too specialised to be handled by a generic service such as GUES. MS-DOS programmers requiring this sort of functionality will write their own application-specific Interrupt Service Routines. From these ISR's, they can take whatever action is necessary to dismiss the interrupt, and call gui_schedule () ill order to pass the event to the main part of the application.

7.1 GUES Provided Routines

In order to register an interest in a class of event, a GUI user calls the GUES routine:

gues_subscribe()

This routine take the following arguments:
* quid—The quid on which Nfunc should be scheduled.
  in_pars—This structure contains an indication of the type of event being subscribed to, and any additional parameters required for that particular subscription (e.g. signal number).
  out_pars—GUI returns a subscription id, and any event specific information in this structure, type, etc.)

When GUES receives an incoming event, it scans its queue of subscriptions for that event, and schedules the notification routine of each. Note that there may well be more than one notification routine registered for a given event, particularly in the case of signals.

GUES will take the approach of calling all relevant notification routines, rather than allowing the notifications to accept or refuse an event. This is less prone to loss of events due to user error.

The following events will be amongst those available for registration:
* ?SIGNL's (in AOS/VS)
* Software interrupts (signal(2) in UNIX)
* Child process terminations.
* AOS/VS Connection Breaks (simulated as obituaries by GUES).
* Unix I/O readiness, as indicated by select(2).

The exact parameters required for each of these events, are specified in the GUES interface specification (Chapter 10).

7.2 User Provided Routines

The User of this service, must provide the notification routine Nfunc. If we call this routine 'user_event_occurred', then the call has the following form:

user_event_occurred (sub_id, event_type, udata, event_param, quid) where the arguments are as follows:
* sub_id—The subscription id returned by GUES on the gues_subscribe call.

* event_type—The type of event, as specified to gues_subscribe ().
* udata—User data, as specified in in_pars to gues_subscribe ().
* event_param—This argument conveys information specific to the event being notified. (e.g. For obituaries, it contains the PID and exit status of the terminated process.)
* quid—The GUI quid on which the notification is being run.

Again, the exact parameters for each event occurrence are specified in Chapter 10.

7.3 Event Concepts and Warnings

This section describes the concepts associated with each of the GUES event subscriptions, and warns about any restrictions implied by their use.

7.3.1 AOS/VS ?SIGNL Events

This subscription allows GUES users to be notified upon receipt of AOS/VS Fast IPCs (?SIGNL).

GUES establishes a single AOS/VS task to be shared by all ?SIGNL subscribers, which is dedicated to doing ?WTSIG calls. The Unique Task ID of this task is returned to each subscriber as output from the gues_subscribe call, and can be used by an application as a parameter to a ?SIGNL system call.

By passing the ?WTSIG task UID to another process, this GUES service can be used to support a Fast IPC mechanism, with no direct data transfer. This is useful in conjunction with a shared memory scheme for data transfer, or in interfacing to unpended Kernel service such as ?QNET.

There are two problems associated with ?SIGNL events:
* Anyone can send a ?SIGNL to your process, without any validation being done.
* ?SIGNLs do not nest, so they may be lost if they are not processed fast enough.

The following precautions overcome these problems:
* Never assume that a ?SIGNL notification was intended for you. It may be for another GUES subscriber, or it may have been sent by the PMGR, or it may have been inadvertently sent by another process. A ?SIGNL notification should be used as an indication that some event may have occurred, and some other .leans used to find out if it actually has. For example, a queue may need scanning, or a flag checking.
* Don't assume that you will get a notification for every ?SIGNL sent.

Whenever a notification is received, all outstanding work should be checked (e.g. a complete queue scan done), rather than assuming that you will get one notification for each piece of work to be done.

GUES will, however, guarantee to give you another notification for any ?SIGNLs received after a notification starts to run, so there are no situations where work will be lost due to a ?SIGNL arriving during a notification.

7.3.2 Unix signal(2) Events

This subscription allows multiple GUES users to be notified upon receipt of Unix signal(2) events.

Each subscriber passes the signal number of interest into GUES, and GUES establishes a signal handler (using sigset(2)), for that signal. Various signals are of use to applications: the SIGUSR1 and SIGUSR2 signals can be used in a similar way to ?SIGNL under AOS/VS (as a Fast IPC mechanism), whilst other signals such as SIGPOLL are of use in interfacing to Kernel services.

The same warnings and precautions apply as for AOS/VS ?SIGNL events, above. Additionally, users should NOT define their own signal handlers, since these will interfere with the GUES handlers for ALL subscribers, with unpredictable results.

Users should also refrain from subscribing to SIGALRM signals, since GUTS uses this subscription internally to support its timer service. Applications should use GUTS timers instead.

7.3.3 Obituary Events

This subscription allows GUES users to be notified of child process terminations, and for AOS/VS, customer/server connection breaks. Each subscriber receives a notification for each obituary, which specifies the pid and exit status of the terminated process.

Under AOS/VS, GUES establishes a separate task to do repeated ?IREC's on the system port for termination messages (?SPTM). Users should not do their own ?IREC's on this port, since they will disrupt the GUES service. Under UNIX, GUES subscribes to its own signal(2) service, with a signal number of SIGCLD, in order to be notified of child terminations. When a notification is received, GUES does repeated wait3(2) calls with the WNOHANG option, to collect termination information for all expired children. Users should not call wait(2) or wait3(2) themselves, as this will disrupt the GUES service for all subscribers.

7.3.4 Unix Select(2) Events

This subscription allows UNIX users to be notified when an I/O condition exists on one of a specified set of file descriptors.

The Unix select(2) system call takes 3 bit array arguments, readfds[], writefds[], and exceptfds[]. Within each of these arrays, each bit represents a defined file descriptor. The readfds[] mask specifies file descriptors on which the caller is interested in doing read(2) calls, the writefds[] mask specifies those on which the caller is interested in doing write(2) calls, and the exceptfds[] mask specifies those on which the caller is interested in exception conditions.

The select(2) call returns information indicating which of the conditions specified in the input actually exist (i.e. which of the specified descriptors are ready for reading, writing, or have exceptions on them). The call can be made to pend until one of the specified conditions exist, or it can be polled.

GUES arranges for gui_run() to call select(2) in a pended fashion, whenever there are no jobs to run from a pended gui_run(). Also, an unpended gui_run() will do a polled select(2) call whenever there are no jobs already queued within GUI.

Each subscriber to the GUES select service has a set of File Descriptor masks, which mimic the select(2) masks. The subscriber passes a pointer to his/her GUES_SELECT_MASK structure into gues_subscribe, and GUES remembers it. The readfds[], writefds[], and exceptfds[] masks which GUES specifies to select(2) are then constructed by OR'ing together the masks of all the subscribers. Hence by manipulating bits in his/her GUES_SELECT_MASK, the subscriber can dynamically add or remove a given file descriptor from the set of files he/she is interested in being notified about.

Whenever a select(2) call indicates an I/O condition, GUES will schedule a single notification for each subscriber whose select mask specifies one or more of the descriptors with conditions on them. Only those subscribers whose masks show that they are currently interested in the files with conditions on them will receive a given notification.

The following warnings apply to users of this service:
* There may be more than one subscriber interested in a given file descriptor, so some care must be taken in handling the notification. For example, if two subscribers set their select masks to register an interest in a read being possible on STDIN, then when there is input available, they will each get their notification routine called. If the first subscriber reads all the available input from the notification routine, and then the second subscriber attempts a read, the read will pend, perhaps for ever!
When using a well known file descriptor (such as STDIN), it may be advisable to do a further polled select(2) call from the event notification, in order to check that the condition still exists.
* It is equally important that one of the notifications clears the I/O condition, or else that all the subscribers clear the offending bits in their select masks. In the above example, if neither notification reads the available input, and they both leave their select masks unaltered, then the process will go into a hard loop, because every time GUES calls select(2), it will show I/O possible, and the subscriber notifications will be scheduled again.
* If any of the subscriber select masks specify a file which is not currently open, then GUI will get an error from select(2), and will terminate the process. Subscribers must therefore be careful to amend their select masks whenever they close a file. Also, if a file is visible to multiple GUES subscribers, then anyone closing that file must define a mechanism for informing the other subscribers, so that they can amend their select masks also.

Note that GUES only does select(2) calls from the well defined points mentioned above. In particular, GUES can never make select(2) calls whilst a user notification is running (since there is only a single base level path), and so as long as the user's select mask is valid whenever gui_run() is called (or returned to) no problem will arise.

Clearly, this subscription must be used with care but if so used it provides a powerful service.

Chapter 8 GUI Interface Specification

This Chapter is a functional description of the preferred form the GUI interface as a specific example.
gui_initialise Initialises the GUI environment.
Format: gui_initialise()
This routine must be called by each library, and by the main application, before any other GUI routine can be called.
gui_allocate_quid
Allocate a queue for job scheduling, and return its identifier.
Format: gui_allocate_quid (priority, user_wakeup, quid)
Parameters:
priority Defines the relative priority of jobs scheduled onto this queue.
user_wakeup If specified (non-NULL), this routine will be called by GUI, whenever a job is scheduled onto this quid.
quid GUI fills in this parameter with the Queue Identifier for the newly allocated queue.

This routine allocates an internal GUI queue, onto which jobs can be scheduled by gui_schedule(). In order to run jobs off this queue, the user must call gui_run(), on the same thread (VS-Task), which allocated it. If the 'user_wakeup' routine is specified, then this will be called whenever a job is scheduled, and on the thread which scheduled it. The user should then call gui_run, on the thread which allocated the quid.
gui_schedule
Schedule a job, to be run on a specific thread.
Format:
gui_schedule (quid, routine, arg1, arg2, arg3, arg4)
Parameters:
quid The quid on which the job should be scheduled. This must be quid a quid returned from a previous call to gui_allocate_quid.
routine The address of the function, to which a call is being scheduled.
arg1–arg4 Arguments, with which the scheduled routines will be called.

Schedules a routine to be called on a particular quid. The routine will get called (with time specified arguments) when the user calls gui_run from the thread which allocated the quid. GUI transparently passes the equivalent of four INT32s (arg1–arg4) to the scheduled routine. By agreement between the scheduling and scheduled routines, these parameters may be used to pass any number of parameters, each of any size, so long as the total space occupied by them is no greater than that used by four INT32s. Effectively, GUI copies four double-words of stack from the scheduler to the scheduled routine, and the interpretation of this block is left to the user.
gui_run
Run previously scheduled routines.
Format:
gui_run(flag)
Parameters:
flag Indicates whether the caller wants to wait if no jobs are ready to run. Set to PEND, or NOPEND.

This routine causes previously scheduled jobs to be run. Jobs are selected in priority order from the quids allocated by the calling task.

If GUI_OPTION_NOPEND is selected, GUI will return to the caller either after running one job, or if none are available.

If GUI_OPTION_PEND is selected, GUI will not return, until the user calls gui_wakeup. It will sleep if no jobs are ready, and run them as they become available.
gui_wakeup
Cause a pended gui_run to return.
Format:
gui_wakeup (quid)
Parameters:
quid Specifies that the thread which owns 'quid', is the one to be awoken.

The user calls this function in order to cause a thread which has called gui_run with the pend option, to return when it finishes running the next job. The specified 'quid' must be owned by the thread which is to be awoken.

If the thread is currently waiting for a job to run, then it will return immediately. If it is not currently within gui_run() at all, then its next call to gui_run() will return immediately.

A routine may also be provided to check that a quid is valid, without having to schedule a job onto it. This is useful for GCSPs, who can use it to check that the quid passed into a service request routine by a user is valid. This prevents the GCSP from discovering, later in its processing, that the quid is invalid, and not being able to tell the user.

The user will also provide user_job Scheduled Routine for the calling sequence for jobs which the user gui_schedule's, with the arguments specified when the job is scheduled with the call to gui_schedule, and with the quid on which the job is scheduled. The user can use quid to re-schedule jobs onto the same quid, or on a call to gui_wakeup if it wishes the thread on which it is running to return from gui_run().

Chapter 9 GUTS Interface Specification

This Chapter provides a functional description of one example of a GUTS interface.

guts_initialise Initialise the GUTS library.

This routine should be called by each component, before any other GUTS routine is called. All but the first initialisation is ignored by GUTS.

guts_start_timer GCSP Request Start a GUTS timer.
Format:
guts_start_timer (nfunc, quid, delay, uarg1, uarg2)
Parameters:
nfunc This is a user notification routine, which will be scheduled by GUTS when the timer expires.
quid This is the quid onto which 'nfunc' will be scheduled when the timer expires.
delay The number of seconds which must elapse before the timer expires, and 'nfunc' is scheduled by GUTS.
uarg1 This parameter is passed transparently back to the user on the notification routine.
uarg2 As uarg1.

This routine is called in order to start a once-off timer event. When the timer expires, in 'delay' seconds, GUTS will schedule the user notification such that it is called from gui_run(), thus: (*nfunc) (uarg1, uarg2, quid). Other parameters may be employed to uniquely identify a single timer.

A good way to ensure uniqueness between several entities using GUTS, is to use a pointer to a control block for a 'user_ref' parameter. So long as the control block remains allocated, no other entity can allocate memory at the same address and hence the 'user_ref' is unique. This approach also means that it is a simple matter to locate the operation which was being timed.

If a regularly repeating timer is required, a timer of the same (or different) name can be scheduled from the notification routine, each time the timer expires.

guts_cancel_timer
Cancel an outstanding timer.
Format:
guts_cancel_timer (identifiers, timeleft)
Parameters:
identifiers Identify the timer uniquely
timeleft If the timer is found, and successfully cancelled, GUTS returns the amount of time which remained before the timer would have expired.

This routine can be called to cancel an outstanding timer, which was previously started with guts_start_timer (). This is useful if, for example, the event being timed completes normally, or is aborted.

guts_check_timer
Check to see how long remains before a timer will expire.
Format:
guts_check_timer (identifiers, timeleft)
Parameters:
identifiers As above
timeleft GUTS returns the time remaining before expiration in this parameter.

This routine can be called in order to check how long is left to go before a specified timer will expire. This is useful for reporting information to management applications.

Chapter 10 GUES Interface Specification

This Chapter provides a functional description of one example of a GUES interface.

gues_initialise() Initialise the GUES library.

This routine should be called by each component, before any other GUES routine is called. All but the first initialisation is ignored by GUES.

gues_subscribe() GCSP Request
Ask to be told about a class of events.
Format:
gues_subscribe (gui_quid, in_pars, out_pars)
Parameters:
gui_quid Specifies a GUI quid, on which the caller wishes to be notified of event receipt. The notification routine specified in 'in_pars' will be scheduled onto this quid each time the event is received.
in_pars Input parameters for the registration. See example below.
out_pars Output parameters for the registration. See example below.

A user calls this routine in order to register an interest in external events, such as AOS/VS Fast IPC's (?SIGNL), UNIX Software Interrupts (signals), or child process terminations (obituaries).

The 'in_pars' packet, contains the type of event, the address of a notification routine to be called on receipt of the specified event, plus any parameters specific to that event.

The 'out_pars' packet contains any information returned by GUES about the registered event.

Some examples of the form which these packets may take follow: Subscribe to VS ?SIGNL events Sues_subscribe() call:
Input parameters:
typedef struct gues_in_pars
event_type Set to the value GUES EVENT VS SIGNL.
nfunc This is the address of the user notification routine, to be called by GUES on receipt of the event.
udata User data, to be passed into 'nfunc'.
Output Parameters:
typedef struct Sues_out_pars
sub_id GUES returns an Identifier for this subscription.
wait_task_uid This member specifies the VS Unique Task ID of the internal GUES task which is being used to await the event. This is needed in order to ?SIGNL the task.

This event is available only under AOS/VS. On receipt of a Fast IPC, the caller's notification routine will be scheduled, such that it is called thus:
(*nfunc) (sub_id, event_type, udata, 0, gui_quid);
The 'gui_quid' is the quid on which the notification is being run.

Subscribe to Interrupt events gues_subscribe() call:
Use of parameters for Software Interrupt event subscriptions.
Input parameters:
typedef struct gues_in_pars
event_type Set to the value GUES_EVENT_INT.

int_num This is the "interrupt number", to which the caller wishes to subscribe. Under UNIX, this is a signal number (defined in signal.h).

nfunc This is the address of the user notification routine to be called by GUES on receipt of the event.

udata User data, to be passed into 'nfunc'

Output Parameters:

typedef struct gues_signl_out_pars sub_id GUES returns an Identifier for this subscription.

This subscription allows multiple entities within a process to be notified upon receipt of a signal, e.g. under UNIX.

On receipt of the specified interrupt, the caller's notification routine will be scheduled, such that it is called thus:

(*nfunc) (sub_id, event_type, udata, int_num, gui_quid);

The 'gui_quid' is the quid on which the notification is being run.

Subscribe to child obituaries gues_subscribe() call:

Use of parameters for subscriptions to child obits.

Input parameters:

typedef struct gues_in_pars event_type Set to the value GUES_EVENT_OBIT nfunc This is the address of the user notification routine to be called by GUES on receipt of the event.

udata User data, to be passed into 'nfunc'

Output Parameters:

typedef struct gues_signl_out_pars

This subscription is supported under AOS/VS and UNIX. It allows one or more entities within a process to be notified upon termination of a child process. Upon termination of a child process (or of a partner in an AOS/VS Customer-Server relationship), the caller's notification routine will be scheduled, such that it is called thus:

(*nfunc) (sub_id, GUES_EVENT_OBIT, udata, obit_ptr, gui_quid);

The 'gui_quid' is the quid on which the notification is being run, and 'obit_ptr' is a pointer to the following structure:

```
{
    USINT32 pid;
    USINT32 status;
} GUES_OBIT;
``` pid This field contains the PID of the terminated process.

status This field indicates how the process terminated.

Under AOS/VS, it contains zero for a normal termination, or else an error code. This error code may be returned from the terminated process (via ?RETURN), or be supplied by GUES to represent an abnormal termination.

Under UNIX, 'status' contains the exit status of the terminated child, as obtained from the wait3(2) system call, documented in UNIX.

Subscribe to select(2) events gues_subscribe() call

Use of parameters for subscriptions to select(2) events.

Input parameters:

typedef struct gues_select_mask typedef struct gues_in_pars event_type Set to the value GUES_EVENT_SELECT select_mask This field must contain a pointer to a GUES_SELECT_MASK structure. If this structure is dynamically allocated, then it must not be freed since GUES continues to access it for the duration of the process.

nfunc This is the address of the user notification routine, to be called by GUES on receipt of the event.

udata User data, to be passed into 'nfunc'.

Output Parameters:

typedef struct gues_out_pars sub_id GUES returns an Identifier for this subscription.

This subscription allows multiple users to be notified of I/O conditions, as implemented by the select(2) system call. Each subscriber to this GUES service has a set of File Descriptor masks, which indicate which files the subscriber is interested in Read, Write and Exception conditions upon.

Whenever a select(2) call indicates an I/O condition, GUES will schedule a single notification for each subscriber whose select mask specifies one or more of the descriptors with conditions on them. Notifications will be scheduled such that thy are called thus:

(*nfunc) (sub_id, GUES_EVENT_SELECT, udata, mask_ptr, gui_quid);

The 'gui_quid' is the quid on which the notification is being run, and 'mask_ptr' is a pointer to a GUES_SELECT_MASK containing the output from the select(2) call (i.e. it indicates which conditions are present on which files' descriptors).

user_event_received() User Notification

Calling sequence for event

Format:

void user_event_received (sub_id, event_type, udata, event_param, gui_quid)

Parameters:

sub_id This is the Subscription ID, which was returned by GUES when the user subscribed to the event which is being notified.

event_type This indicates the type of event which has arrived (GUES_EVENT_VS_SIGNL, GUES_EVENT_INT, GUES_EVENT_OBIT, or GUES_EVENT_SELECT).

udata This is a user data parameter, which is passed transparently by GUES. It has the value specified by the user on the subscription.

event_param The use of this parameter is dependent on the particular event type.

gui_quid Specifies the GUI quid on which the notification is being run.

This routine gets called when an event which has previously been subscribed to is received. Note that the name of this routine is actually assigned by the user, and its address passed on the subscription call. The name 'user_event_received()' is used simply for example.

Unlike GUTS timers, event subscriptions remain in force for the duration of the process invocation. There is no need to renew a subscription from the notification routine.

Chapter 11 GUI Programming Example

This Chapter shows the use of GUI to implement a simple GCSP, which provides an unpended read service. It also shows a simple User, which invokes the services of the GCSP, to perform unpended reads. The example is written in the 'C' language, but is not intended as a complete program. Rather, it is intended to illustrate GUI usage. This example is specific to AOS/VS, since it uses a slave AOS/VS task to do pended I/O. This is not the way GUI should be used if UNIX portability is an issue, however, a more realistic example would be unnecessarily complex and less informative.

The example is also rather lax on error checking. Any real user of GUI should be sure to check return codes exhaustively, since the effects of failed GUI requests are likely to be serious and difficult to trace later on.

```
        Globals
GUI_QUID slave_quid; /* Quid allocated to GCSP slave task */
GUI_QUID user_quid; /* Quid of user's main task */
        End Globals GCSP Code
/* GCSP_init()*
* Routine to be called by user, to initialise the GCSP.
* Spawns a slave VS-Task, to do pended requests.
*/
GCSP_init () }extern GCSP_slave ();
    mtask (GCSP_slave, $STACK_SIZE); /* start slave task */
    gui_initialise
}
/* GCSP_slave ()
*
* Runs as a slave VS-task. Just calls gui_run, from where any
* scheduled calls will be run.
*/
GCSP_slave
{
    gui_allocate_quid (1, NULL, &slave_quid);
    while (TRUE)
    {
        /* Run any routines the GCSP tells us to. */
        gui_run (GUI_OPTION_PEND);
    }
}

/* GCSP_async_read()
*
* The unpended read Request routine. Builds an internal
* representation of the request (understood within the
* GCSP), and schedules it to run on the slave task.
*
* The slave will call the users notification routine, when the
* read is done.*/
GCSP_async_read (Nfunc, quid, buff, fp, nbytes)
void (*Nfunc) (); /* Users notification routine */
GUI_QUID quid; /* User quid to run notification on */
char *buff; /* Buffer, to read into */
FILE *fp; /* File descriptor to read from */
INT32 nbytes; /* Number of bytes to read */
{
READ_PKT *read_pkt;
extern slave_read();
/* Allocate an internal request packet, and fill in
* parameters from our arguments. */
read_pkt = (READ_PKT *) alloc (sizeof (READ_PKT));
read_pkt->notification_quid = quid;
read_pkt->notification_routine = Nfunc;
read_pkt->fp = fp;
read_pkt->buff = buff;
read_pkt->nbytes = nbytes;
/* Schedule the pended read to happen on our slave task
gui_schedule (slave_quid, slave_read, read_pkt);
/* ... and return */
return (OK);
}

/* slave_read()
*
* This GCSP routine actually does the pended read.
* It is run from gui_run, on the slave task, when scheduled by
* GCSP_async_read().*/
slave_read (read_pkt)
READ_PKT *read_pkt;
{
/* Do the pended read. */
fread (read_pkt->buff, read_pkt->nbytes, 1, read_pkt->fp);
/* Request done - schedule the notification back onto the
```

```
* User's main task; passing the full data buffer back as
* 'argl' */
gui_schedule (read_pkt->notification_quid,
    read_pkt->notification-routine,
    read_pkt->buff
)
/* Free up the internal request packet */
free (read_pkt);
return (OK);
}
        End GCSP Code User Code
/* The User's main routine. This simple example just issues
* Unpended reads and waits for them to complete, until the
* End-Of-File is reached.*/
USER_main ()
}
FILE *fp;
char buff [$BUFF_SIZE];
extern USER_read_done ();
/* Initialise the world. */
gui_initialise
GCSP_init ();
gui_allocate_quid (1, NULL, &user_quid);
fp = fopen ("testfile", "r");
while (!feof (fp))
    {
    /* Make unpended request. */
    GCSP_async_read (USER_read_done, user_quid, buff, fp);
    /* In practice, the user would do some other processing
    * here. Also, there would probably be multiple requests
    * outstanding.
    * For simplicity in this example, we just wait for the
    * read to complete. */
    gui_run (GUI_OPTION_PEND);
    }
}

/* USER_read_complete
*
* The user's notification routine, called by GUI, from gui_run,
* when the request completes.
* It does some processing of the received data, and then calls
* gui_wakeup(), so that when we return, the task will return
* from gui_run, enabling another request to be made. */
USER_read_done (buff)
char *buff(); /* This is 'argl' */
{
    process_data (buff); /* Don't care what it does */
    gui_wakeup (user_quid);
    return (OK);{
        End User Code
```

Chapter 12 Internal Structure

This Chapter represents the design of the AOS/VS version of GUI. The UNIX and MS-DOS versions can be as similar as possible, though there will be differences. At points in this specification where there are specific, evident, differences or issues, these will be noted by comments in square brackets, thus: [UNIX: Text of UNIX issue].

Figure 18:
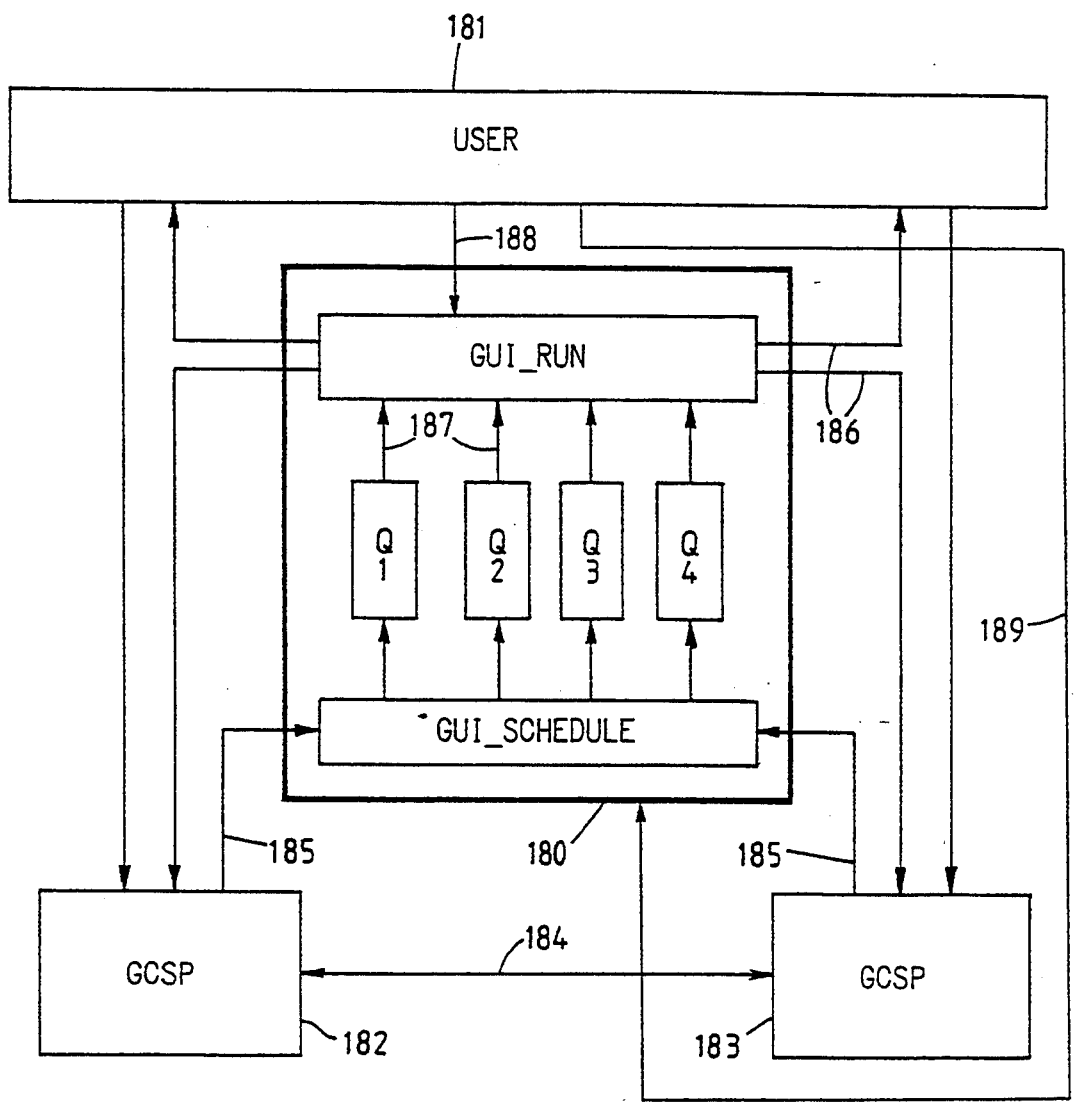
FIG. 18 shows the structure of a GUI.

GUI has a very simple structure, illustrated in FIG. 18. GUI is represented by the heavy line block 180 consists merely of a set of queues, of which four are shown here, denoted Q1, Q2, Q3, Q4, containing Notifications waiting to be run. Queues are allocated by calls to 'gui_allocate_quid()'. Notifications are placed on queues by calls to 'gui_schedule()', and taken off queues by 'gui_run()', as illustrated. FIG. 18 does not show the other GUI routines.

GUI forms the basis of the tasking and flow of control environment for the network communication system.

The User application 181 makes unpended requests of one or more GCSFs, two GCSPs 182 and 183 being illustrated. These GCSP's may, in turn, make requests of other GCSP's and GCSP 182 and GCSP 183 are shown communicating with each other over path 184 in the example of FIG. 18.

In the course of its processing, a GCSP may schedule routines to be called, in itself, in another GCSF, or in the User. This scheduling is indicated by the arrows 185 from the GCSP's to 'gui_schedule', and results in a notification being put on to an internal GUI queue, to be picked up by 'gui_run'. Typically, the scheduling will be done from a separate VS-task awaiting external events. [UNIX/MS-DOS: From interrupt level.]

Scheduled routine calls get run when the User calls 'gui_run'. This is shown by the arrows 187 from the Queues Q1-Q4 into 'gui_run' and the arrow 188 from User 181 into gui_run() . . . The scheduled calls may result in routines in the User 181, or within GCSPs 182, 183 being called, again as shown by arrows 186.

As previously noted, the User may need to schedule routines on to quids. This is shown by the connection 189.

Chapter 13 Data Structure Specification

Because of the transient, and runtime specific nature of GUI notifications, there is no need to preserve any information across process invocations. All of the GUI structures are therefore memory resident. There are no on-disk structures. In the following data structure pictures the sizes of various members (pointers in particular) are shown as they would be on the MV. These are not necessarily the same as on the PC.

13.1 The GUI Queues

The main data structures within GUI are the job queues. These form the only coupling between 'gui_schedule', and 'gui_run'. The job queues are anchored off per-task headers, which are themselves on a linked list, anchored in a single Queue-descriptor. Hence there is only one global anchor, off which all GUI structures hang, directly or indirectly.

The entries on the job queues are Notification Control Blocks (NCB's), containing the information necessary for GUI to run the requested notifications, with the indicated parameters.

Figure 19:
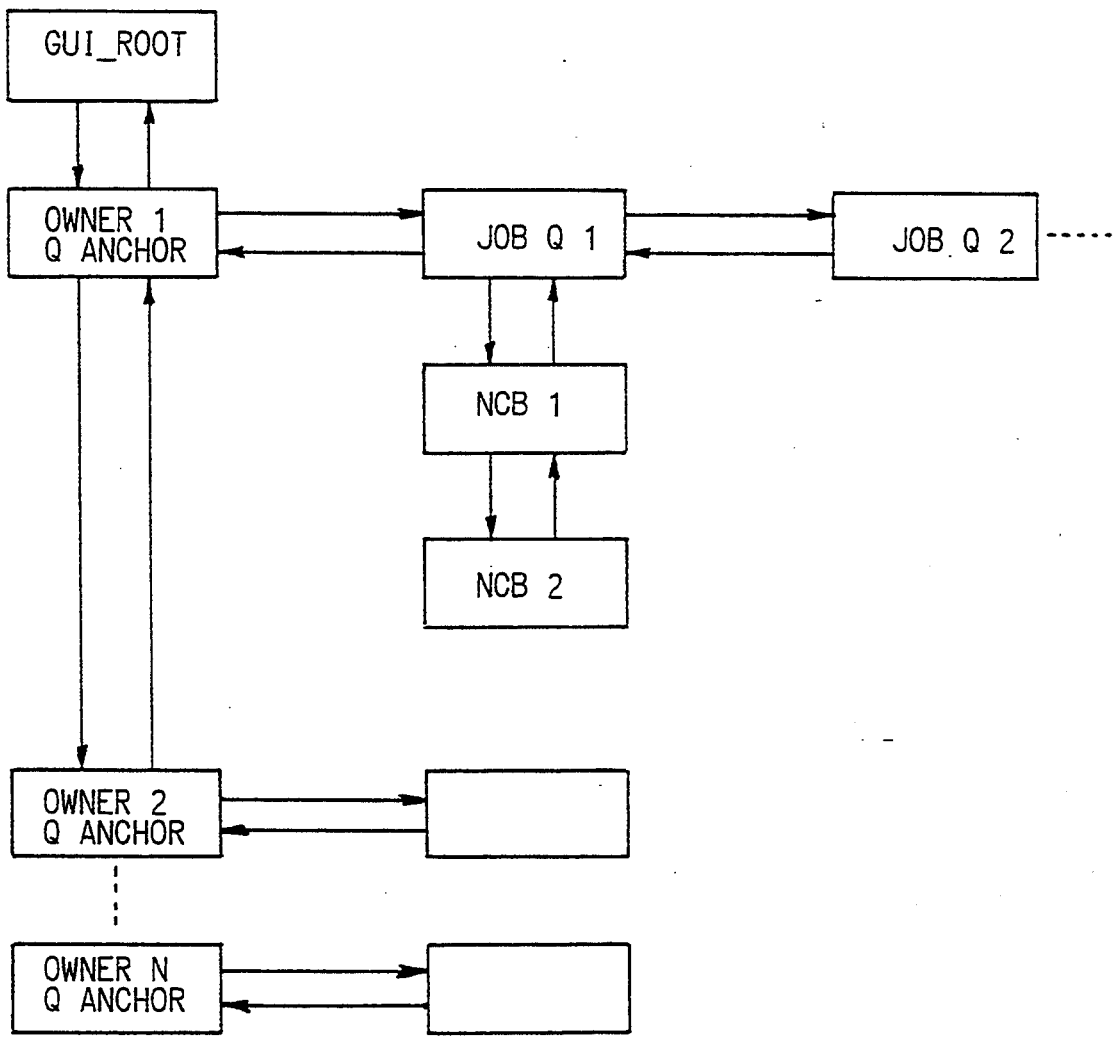
FIG. 19 shows a job queue structure for a GUI.

A typical arrangement is shown in FIG. 19. This example shows Job Queue lists for 'N' owners (VS-tasks). [UNIX/MS-DOS: There is only one owner.]

Owner 1 has two 'quids' Job Q1 and Job Q2 allocated, with two jobs scheduled onto the first of them, and none on the second. Owners 2 and N, each have one quid allocated, with no jobs scheduled.

All the lists are doubly-linked MV queues, so that the MV hardware queuing instructions can be used. These instructions are atomic, and eliminate the need for locks. [UNIX/MS-DOS: If the hardware in these environments does not provide similar instructions, then it may be necessary to disable interrupts for the duration of Enqueues and Dequeues.]

13.1.1 GUI_ROOT Descriptor

Figure 20:
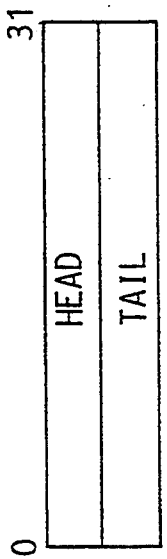

This is the root anchor for all GUI queues. It has the structure shown in FIG. 20. The two members are pointers, which point to the First and Last Owner Queues. As with all MV queues, these members are both −1, if the Q is empty.

13.1.2 Per-owner list anchor

Figure 21:
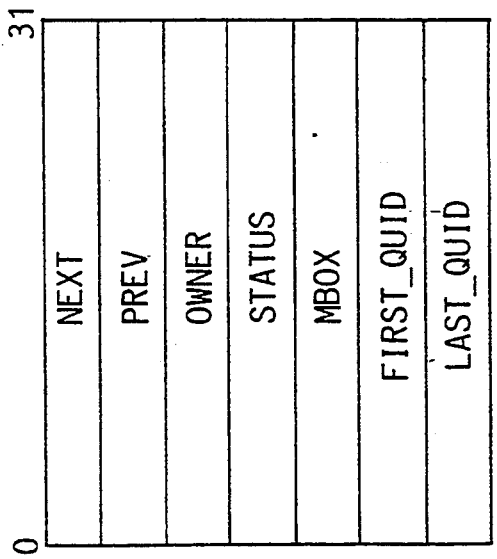

This structure is what is on the list anchored in GUI_ROOT and is illustrated in FIG. 21. It contains 'next' and 'prev' pointers, an owner id, and a Q descriptor for the list of 'quids' owned by that user. The Job Queues hanging off this anchor are sorted in priority order. There are also some fields used to control access to the Q by the owner.

The 'owner' field identifies the Owner task of the Job Queues on this list. In order to avoid the overhead of system calls to discover the VS-Task-ID, the Stack Base of the Owner task is used for this identification. This approach is in common with the DG Language Runtime Libraries, and therefore imposes no extra constraints.

The 'mbox', is an inter-task mailbox, on which the owner waits if he does a pended 'gui_run', when there are no notifications scheduled on any of the owned job queues. The task will be awoken when another task does a 'gui_schedule', or 'gui_wakeup', on a 'quid' owned by this task. VS inter-task system calls (?REC and ?XMT), will be used for this purpose. [UNIX/MS-DOS: The wakeup will be done from interrupt level. Spin locks will be used for MS-DOg, and a "select()" system call for UNIX.]

The 'status' field contains various control bits, and is defined in FIG. 22. The 'running' bit is set when GUI is running a notification for this Owner and is used to prevent nested calls to 'gui_run'. The 'waiting' bit is used when the task is waiting on the 'mbox'. The 'wake_up' bit is set in order to cause a running task to wake up after the currently running job. The 'job_scheduled' bit is set by gui_schedule, whenever a job is scheduled. This closes the window which would otherwise exist, when a job gets scheduled whilst another VS-Task is searching for a job to run.

13.1.3 Job Queue Anchors

This structure is what the actual NCB's for a given 'quid', are anchored to. It is shown in FIG. 23 and contains the Job Q id 'quid', and its priority, plus the usual Q descriptor, for the NCB's.

13.1.4 Notification Control Blocks

These are the control blocks, which are queued onto the Job Q's. Each one represents a Notification which has been scheduled, and contains all the information required to run it.

These control blocks have the format shown in FIG. 24. The 'next' and 'prev' fields point to the next and previous NCB's on this Job Q. The other members are the parameters passed to 'gui_run()' and which will be passed to the notification routine, when it gets run.

It can be seen from this structure, that the memory requirement for each outstanding, scheduled notification, is 7 double words (28 bytes). It will be left to the GUI Users to ensure that memory is available for these blocks. If GUI cannot allocate an NCB when it needs one, it will return an error from 'gui_schedule()'.

13.2 Quid Table In order to speed-up access to the GUI Job Queues, there is a table, indexed by 'quid', which gives the location of the Job Q identified by 'quid' Each entry in this table has the format shown in FIG. 25.

To avoid the need to lock the quid table, entries are written atomically. An unallocated quid will have the value NULL in the 'job_q_ptr' field of its table entry. During allocation, this field will be filled in atomically, as the last stage of the allocation, at which point the quid becomes valid.

Again, to avoid the need for locks, the table can be a fixed size, of 256 entries. This imposes a limit on the number of available quids, of 256. A shared access scheme can alternatively be implemented, allowing shared read-only access of the quid table, but exclusive write access, so that the table can be grown when it becomes full.

Quids are allocated started at a value of 1, leaving the value 0 free as a special value (NULL_QUID). Additionally, all negative values are invalid, and reserved for special meanings.

13.3 Within the context of the data structure described above by way of example, this Chapter concludes with a single example of the actions which may be taken by one of the GUI modules, namely procedure gui_allocate_quid (priority, user_wakeup) begin get the callers stack base;
   search the owner Q chain for an anchor owned by this task;
   if (owner anchor not found)
   begin
      allocate a new per-owner list anchor;
      fill it in;
      add it to tail of the owner Q chain;
   end
   allocate and init Job q anchor;
   put allocated quid into Job Q anchor;
   put user_wakeup into Job Q anchor;
   add Job Q to the owners Job Q chain, at a point determined by priority;
   obtain the next available quid, and claim that slot in the quid table;
   put pointers to the owner anchor, and Job Q, into the claimed slot;
   return the quid just allocated;
   end.

The module specifications for gui_schedule, gui_run, etc. can be analogously derived.

13.4 GUI Memory Management

GUI can have its own memory management scheme, consisting of a pool of memory blocks, of suitable sizes for the NCB's, Job Q's, and Owner Anchors. The aim of this scheme is to provide a more efficient allocation mechanism than the standard C runtimes, based on the knowledge that most of the memory required will be in blocks of the same size. However, the standard C functions 'alloc' and 'free' may be used.

Chapter 14: GUI and Communications Server System

Figure 26A:
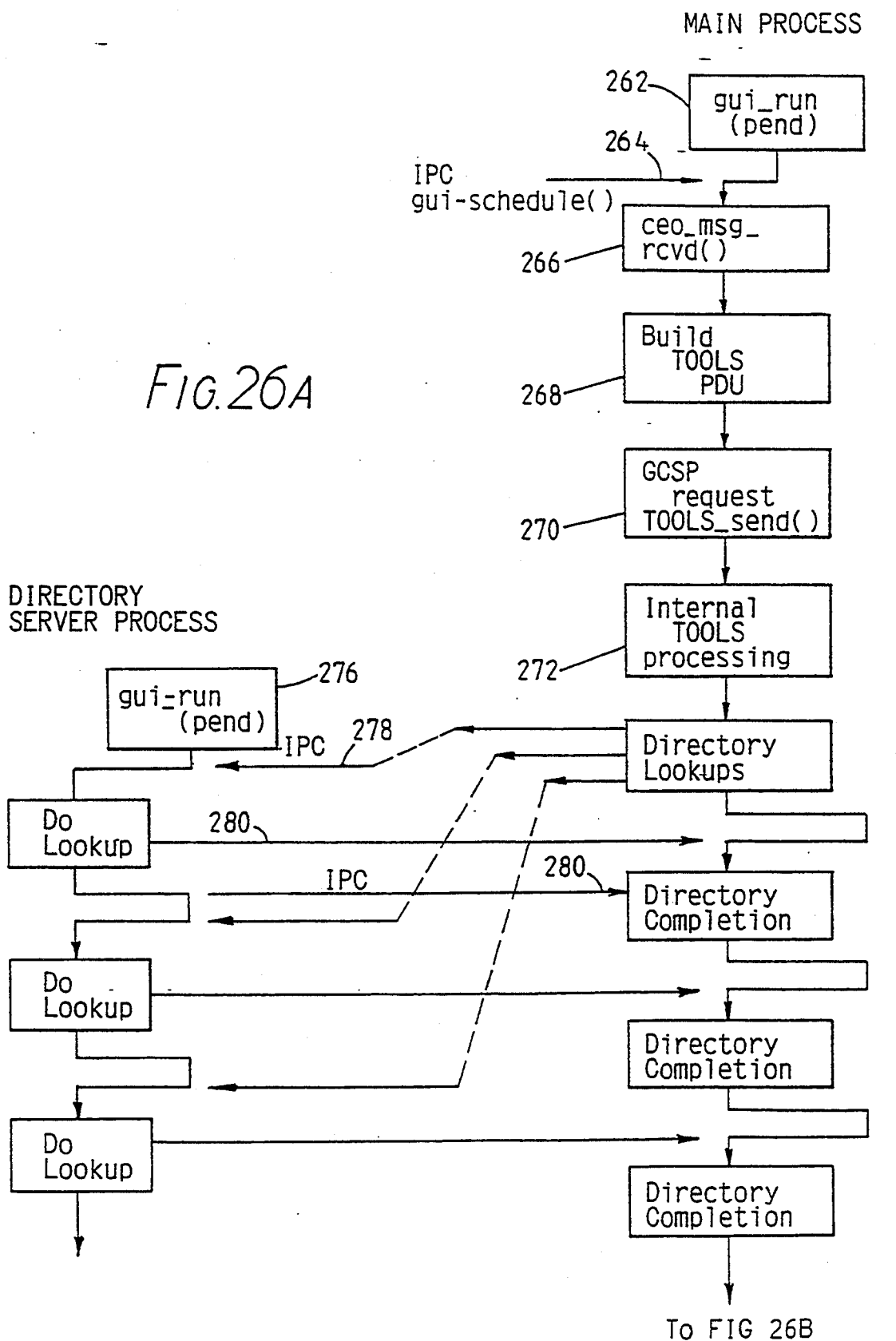
FIGS. 26A and 26B show an example of usage of GUI within the communications server network.
Figure 26B:
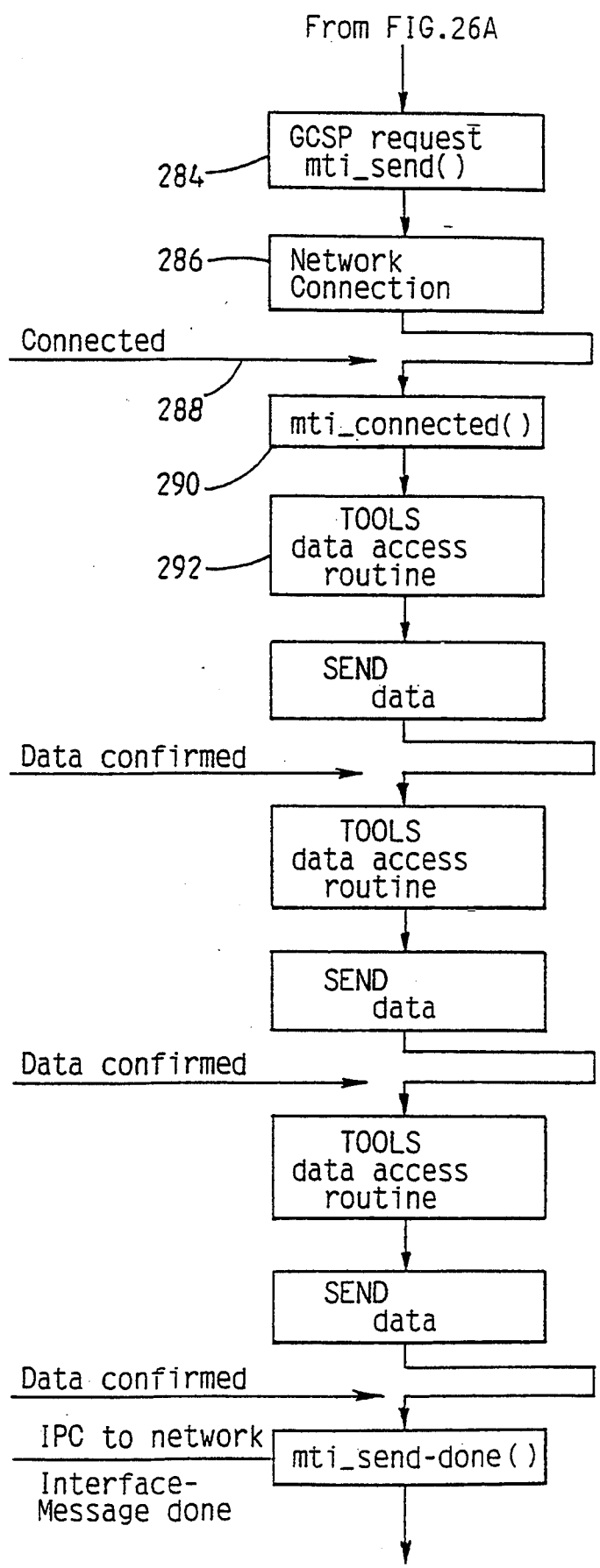

FIGS. 26A, 26B illustrate the basic outline of the operations which result when a message is received from a network interface and needs to be sent to its destination. This is given purely as a simplified example in order to avoid obscurity arising from excessive detail. The notification that there is a message to send will come from the specific routines 45 (FIG. 3) in the form of an IPC from another server process. It is assumed that the software interface 44 is waiting within gui_run(pend), as indicated at 262. At 264, the IPC comes in and puts a routine on a GUI quid. If the gateway is a CEO gateway 12A, for example, this will be a routine ceo_msg_rcvd() 266. Because the software interface is in gui_run(pend), ceo_msg_rcvd() will be run and will schedule another routine, namely build_PDU() 268 which will likewise be run. This routine is a TOOLS routine which implements functions well understood per se; it builds a PDU in X400 1988 format as used on the UMB, making use of ARTX400, by getting each field from the CEO message, converting it to the UMB format and adding it to the FDU being built. This can be done by a simple add item routine additem() which can be implemented conventionally, without going through the procedure of being gui_scheduled and gui_run, since ART routines do not do a lot of processing.

Ceo_msg_rcvd() also schedules a GCSP request TOOLS_send() 270 which sends the message out on to the universal messaging backbone 15. TOOLS_send() firstly performs internal processing 272 in which it goes through the recipient list for every recipient (there may be more than one in general) and makes a directory look-up for every recipient, as indicated at 274. The directory look-ups are handled by a separate directory server process, also running within gui_run() 276, each look-up being initiated by an IPC 278 and the results being returned by IPCs 280. Directory completion is determined at 282 for each look-up in turn and then the message is submitted to GCSP request routine 284 (FIG. 26B) mti_send(), which implements the actual sending over the UMB 15. The network connection is established at and the event "connected" 288 is signalled via the routine mti_connected 290. TOOLS_data_access() 292 then gets the message data from disk and data send 294 takes place. This procedure is followed for all recipient gateways in turn.

For simplicity only the barest outline of the protocols followed in message transmission are here given. The Figures do not illustrate the data confirmation procedures, nor the saves to disk which take place at various stages, e.g. where indicated by asterisks. Moreover the Figures cannot bring out the real essence of GUI, since they appear to illustrate a conventional sequence of routines which could be implemented in the normal manner of linear programming languages. The routines must indeed implement a sequence of operations, which must follow the well established principles of data communication, but the significant point about the implementation in GUI is that the routines do not simply call each other in the correct sequence and pend until completion. Rather their notification routines or jobs are put on to the GUI quids by calls to gui_schedule() and run by calls to gui_run(), as explained above with reference to FIGS. 13 to 17.

What is more, in a real life situation, many messages will be handled simultaneously, being in different stages of handling from message to message. This is more or less impossible to illustrate meaningfully in a drawing but it can readily be understood that GUI, as described above is ideally suited to handle this situation, since all the different notification routines or jobs to be run are put on to the GUI quids and they all get run in turn as a result of the calls to gui_run(). Also, in a communications server system, jobs have varying priorities and it is easy to implement the different priorities by the use of quids with different priorities.

| IV ABBREVIATIONS AND ACRONYMS | |
| --- | --- |
| AOS/VS | Data General operating system for its MV computers |
| ART | ASN.1 Run Times - library routines, decode/encode between transfer and internal syntax |
| ASN.1 | Abstract syntax notation 1, international (ISO) standard for abstract definition of the representation of data types |
| AU | Access unit |
| C | Programming language |
| CCITT | International Telephone & Telegraph Consultative Committee |
| CEO | Data General office automation system |
| CS | Communications server |
| CSID | Called subscriber identifier |
| DG | Data General Corporation |
| DISOSS | IBM Office automation system |
| ECS | External calling sequence |

-continued

IV ABBREVIATIONS AND ACRONYMS

| | |
|---|---|
| GCSP | GUI-conformant service provider |
| GUES | Generic unpended event-handler service |
| GUI | Generic unpended interface |
| GUTS | Generic unpended timer service |
| ID | Identifier |
| IPC | Inter-process communication - message passed between two processes |
| I/O | Input/output |
| IBM | International Business Machines Corporation |
| ISO | International standards organisation |
| LAN | Local area network |
| MRC | Message-based reliable channel, standard 400 Mb/s bus |
| MTI | Message transfer interface |
| MS-DOS | Standard operating system for PC's |
| MV | Data General computers running AOS/VS |
| NCB | Notification control block |
| OS | Operating system for a computer |
| PAD | Packet assembler/disassembler |
| PC | Personal computer (IBM or clone) |
| PDN | Public data network |
| PDU | Protocol data unit - information passed in single structured chunk |
| PID | Process identifier |
| PROFS | IBM Office automation system |
| PSTN | Public switched telephone network |
| PTT | Postal, telegraph & telephone administration |
| Q | Abbreviation for Queue |
| QUID | Queue identifier |
| RUA | Remote used agent |
| SNA | Systems network architecture IBM network |
| SNADS | IBM message protocol |
| VS | = AOS/VS |
| X25 | Packet switching protocol |
| X400 | CCITT standard for message handling |
| X500 | CCITT standard for directory service |

Note that reference should be made to published manuals for an explanation of AOS/VS terminology.

The invention may be embodied in yet other specific forms without departing from the spirit or essential characteristics thereof. Thus the present embodiments are to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A digital computer system comprising (i) an operating system, (ii) a plurality of routines operable under said operation system, and (iii) a plurality of queues for job data identifying routines to be run, said routines including routines in first, second and third modules, said first module including user routines, said second module including service routines providing services and said third module including interface routines, said user routines including routines requesting services from said service routines, said interface routines including a schedule routine callable by each service routine to place job data on a selected one of said queues and a run routine callable by a user routine to cause a notification routine identified by job data on a selected one of said queues to be run, at least some said service routines providing return results for said first module of routines, wherein, said queues are in sets allocated to a plurality of different owners and wherein each owner can only call said run routine in respect of a queue which that owner owns; and wherein, following a request to a service routine, processing within said first module can continue without pending for a return result from a service routine.

2. A digital computer system comprising (i) an operating system, (ii) a plurality of routines operable under said operation system, and (iii) a plurality of queues for job data identifying routines to be run, said routines including routines in first, second and third modules, said first module including user routines, said second module including service routines providing services and said third module including interface routines, said user routines including routines requesting services from said service routines, said interface routines including a schedule routine callable by each service routine to place job data on a selected one of said queues and a run routine callable by a user routine to cause a notification routine identified by job data on a selected one of said queues to be run, at least some said service routines providing return results for said first module of routines, wherein each of said queues has a data structure including;
   (a) the priority level of the queue,
   (b) the identifier for the queue,
   (c) pointers to control blocks for the first and last notification routines on the queue, and
   (d) pointers to the next and previous queues,
and wherein each control block has a data structure including:
   (e) pointers to the next and preceding control blocks,
   (f) a pointer to said notification routine, and
   (g) arguments to be passes to said notification routine; and
wherein, following a request to a service routine, processing within said first module can continue without pending for a return result from a service routine.

3. A digital computer system according to claim 2, wherein said queues are in sets allocated to a plurality of different owners and wherein each owner can only call said run routine in respect of a queue which that owner owns, and wherein said data structure further includes a plurality of anchor structures, one per owner, and each including:
   (h) pointers to the next and preceding owner anchor structures,
   (i) a pointer to a stack base,
   (j) a plurality of status bits,
   (k) a pointer to an identifier for at least one queue owned by that owner.

4. A network communication system including a plurality of gateways for serving respective access units, said gateways being connected to communicate with each other through a message handling system, wherein at least one gateway comprises:
   a network interface providing access to the access unit served by that gateway,
   a message transfer interface for sending messages to and receiving messages from said message handling system, and
   a software interface including a library of routines which provide communication between said message transfer interface and said network interface and process data passing through that gateway to effect at least format conversion, and wherein said routines in said software interface include routines in first, second and third modules, said first module including user routines, said second module including service routines providing services and said third module including interface routines, said user routines including routines requesting services from said service routines, said interface routines including a schedule routine callable by each service routine to place job data on a job data queue and a run routine callable by a user routine to cause a notification routine identified by job data on said queue to be run, at least some said service routines providing return results for said first module of routines, wherein, following a request to a service routine, processing within said first module can continue without pending for a return result from a service routine.

5. A network communication system according to claim 4, wherein said run routine is callable with a flag indicating whether said run routine is to pend or not pend in the event there is no job data on said queue.

6. A network communication system according to claim 5, wherein said third module further includes a wake-up routine callable by a user routine to signal to said run routine when pended that it should return.

7. A network communication system according to claim 4, wherein at least some of said service routines each takes an argument pointing to one of said notification routines, enabling each user routine to pass a pointer to a selected one of said notification routines to be scheduled on to said queue.

8. A network communication system according to claim 4, wherein there is a plurality of job data queues and said schedule routine takes an argument identifying which queue job data identifying a notification routine is to be placed on.

9. A network communication system according to claim 8, wherein said queues have differing priorities and wherein said run routine runs notification routines in order of priority of their queues.

10. A network communication system according to claim 9, wherein said run routine runs notification routines within a queue in the order in which they were placed on said queue by said schedule routine.

11. A network communication system according to claim 8, wherein said schedule routine takes as arguments said indication of which queue a notification routine is to be placed on, a pointer to said notification routine which is to be placed on said queue and a plurality of arguments for passing to said service routine.

12. A network communication system including a plurality of gateways for serving respective access units, said gateways being connected to communicate with each through a message handling system, wherein at least one said gateway of said plurality of gateways comprises:

a network interface providing access to a selected access units served by that gateway, a message transfer interface for sending messages to and receiving messages from said message handling system, a software interface which matches said message transfer interface, computer means for executing processing routines for handling at least one of messages to be transmitted and received messages, means storing a plurality of said routines which provide communication between said message transfer interface and said software interface, and means storing a plurality of specific ones of said routines individual to that gateway and providing communication between said network interface and said software interface, wherein said specific routines convert between the format and protocols of the network interface and the format and protocols of said software interface and wherein communications between said gateways on said message handling system are effected in protocol data units including an envelope part and a message part, said envelope part including data identifying the message originator and non-gateway specific data identifying the message recipient, wherein said routines include service routines implementing services required during message handling, and wherein said computer means is operative to execute a main processing task including a plurality of said routines, during execution of a calling routine of said main processing task to call at least one of said service routines, continue with further processing in said main processing task without pending said at least one called calling routine, terminate said service routine and store job data identifying a notification routine, execute a run routine within said main task to cause a notification routine identified by stored job data to be executed.

13. The network communication system of claims 12 wherein said envelope part contains no data which is specific to the gateway serving the message recipient.

14. A network communication system including a plurality of gateways for serving respective access units, said gateways being connected to communicate with each through a message handling system, wherein each gateway of said plurality of gateways comprises:

a network interface providing access to said access units served by that gateway, a message transfer interface for sending messages to and receiving messages from said message handling system, a software interface which matches said message transfer interface, computer means for executing processing routines for handling at least one of messages to be transmitted and received messages, means storing a plurality of generic ones of said routines which provide communication between said message transfer interface and said software interface, and means storing a plurality of specific ones of that routines individual to said gateway and providing communication between said network interface and said software interface, wherein said specific routines convert between the format and protocols of the network interface and the format and protocols of said software interface and wherein communications between said gateways on said message handling system are effected in protocol data units including an envelope part and a message part, said envelope part including data identifying the message originator and non-gateway data identifying the message recipient.

15. A network communication system according to claim 14, wherein said message handling system is in accordance with the CCITT X400 Standard.

16. A network communication system according to claim 14, wherein said message handling system is in accordance with the CCITT X400 Standard, 1988 version.

17. A network communication system according to claim 16, wherein one of said gateways includes a network interface to CCITT X400 Standard, 1984 version, user agents.

18. A network communication system according to claim 14, including a document converter accessible by each said gateway and wherein said envelope part of any protocol data unit whose message part consists of at least part of a document includes information identifying the document format, and wherein said plurality of specific routines of each gateway includes routines responsive to received information identifying said document format of a received message to submit said message part automatically to said document converter when said received information identifying said document format identifies a format incompatible with said access units served by the receiving gateway, whereby gateways are free to transmit in any document format without regard to said document formats acceptable to recipients.

19. A network communication system according to claim 14, including at least one directory accessible by each gateway and wherein said routines include (1) routines which submit originating gateway data, said originating gateway data identifying the message originator and the message recipient, to said at least one directory for inclusion in a protocol data unit and (2) routines which submit message originator data and message recipient data from a received protocol data unit to said at least one directory to determine at least said message recipient in the format required by said network interface of that receiving gateway.

20. A network communication system according to claim 19, including a main directory unit holding a directory which is directly accessible by all said gateways on said message handling system.

21. A network communication system according to claim 20, wherein said main directory is a directory in compliance with the CCITT X500 Standard.

22. A network communication system according to claim 19, wherein at least one gateway includes a directory unit holding a directory which is indirectly accessible by said other gateways via said message handling system and said one gateway.

23. The network communication system of claim 14 wherein said envelope part contains no data which is specific to the gateway serving the message recipient.

24. In a network communication system comprising a plurality of gateways for serving respective access units, said gateways being connected to communicate with each through a message handling system, a method of handling messages comprising the steps of: (a) providing each gateway with a network interface providing access to said access units served by that gateway, (b) providing each gateway with a message transfer interface for sending messages to and receiving messages from said message handling system, (c) processing a message entering said network interface by a library of specific routines matched to said access units to provide an intermediate message in a system-standard format, (d) processing said intermediate message by a library of core routines which are substantially the same in all gateways to form at least one protocol data unit including an envelope part and a message part, said envelope part including data identifying the message originator and data identifying the message recipient but no data specific to the gateway serving said message recipient, wherein said library of specific routines converts between the format and protocols of said network interface and the format and protocols of said intermediate message and said library of core routines converts between said format and protocols of said intermediate message and the format and protocols of said message transfer interface, (e) transmitting said at least one protocol data unit on said message handling system via said message transfer interface.

25. A method according to claim 24, further including the steps of:
(f) processing a protocol data unit entering said message transfer interface by said library of core routines to form an intermediate message,
(g) processing said intermediate message by said library of specific routines to form a local message,
(h) transmitting said local message to an access unit via said network interface.

26. A method according to claim 24, wherein said message handling system is in accordance with the CCITT X400 Standard, 1988 version.

* * * * *